United States Patent
Huseby et al.

(10) Patent No.: US 12,505,927 B2
(45) Date of Patent: Dec. 23, 2025

(54) SYSTEMS AND METHODS FOR DIAGNOSING NEURODEGENERATIVE DISEASES VIA MACHINE LEARNING AND BLOOD RNA

(71) Applicant: Arizona Board of Regents on Behalf of Arizona State University, Tempe, AZ (US)

(72) Inventors: Carol J. Huseby, Tempe, AZ (US); Paul Coleman, Fountain Hills, AZ (US)

(73) Assignee: Arizona Board of Regents on Behalf of Arizona State University, Tempe, AZ (US)

(*) Notice: Subject to any disclaimer, the term of this patent is extended or adjusted under 35 U.S.C. 154(b) by 0 days.

(21) Appl. No.: 18/263,503

(22) PCT Filed: Jan. 28, 2022

(86) PCT No.: PCT/US2022/014350
§ 371 (c)(1),
(2) Date: Jul. 28, 2023

(87) PCT Pub. No.: WO2022/165205
PCT Pub. Date: Aug. 4, 2022

(65) Prior Publication Data
US 2024/0096490 A1     Mar. 21, 2024

Related U.S. Application Data

(60) Provisional application No. 63/250,889, filed on Sep. 30, 2021, provisional application No. 63/143,616, filed on Jan. 29, 2021.

(51) Int. Cl.
*G16H 50/20* (2018.01)
*G06N 20/20* (2019.01)
*G16B 25/10* (2019.01)
*G16B 40/20* (2019.01)
*G16H 50/70* (2018.01)

(52) U.S. Cl.
CPC ............ *G16H 50/20* (2018.01); *G06N 20/20* (2019.01); *G16B 25/10* (2019.02); *G16B 40/20* (2019.02); *G16H 50/70* (2018.01)

(58) Field of Classification Search
None
See application file for complete search history.

(56) References Cited

U.S. PATENT DOCUMENTS

| 2014/0378439 A1 | 12/2014 | Dezso et al. |
| 2020/0027557 A1 | 1/2020 | Karow et al. |
| 2020/0309795 A1 | 10/2020 | Nagele |

FOREIGN PATENT DOCUMENTS

| WO | 2011109503 A1 | 9/2011 |

OTHER PUBLICATIONS

International Search Report and Written Opinion issued May 4, 2022 in International Application PCT/US2022/014350, 8 pages.

*Primary Examiner* — G. Steven Vanni
(74) *Attorney, Agent, or Firm* — Polsinelli PC

(57) ABSTRACT

A processor is configured to implement a machine learning model that is trained to select transcripts in blood for distinguishing neurodegenerative diseases. The algorithm is developed via machine learning and leverages concepts associated with blood-based changes in mRNA gene expression for differentiating patients of any neurodegenerative disease regardless of the proteins or their post-translational modifications occurring in disease.

14 Claims, 30 Drawing Sheets
(26 of 30 Drawing Sheet(s) Filed in Color)

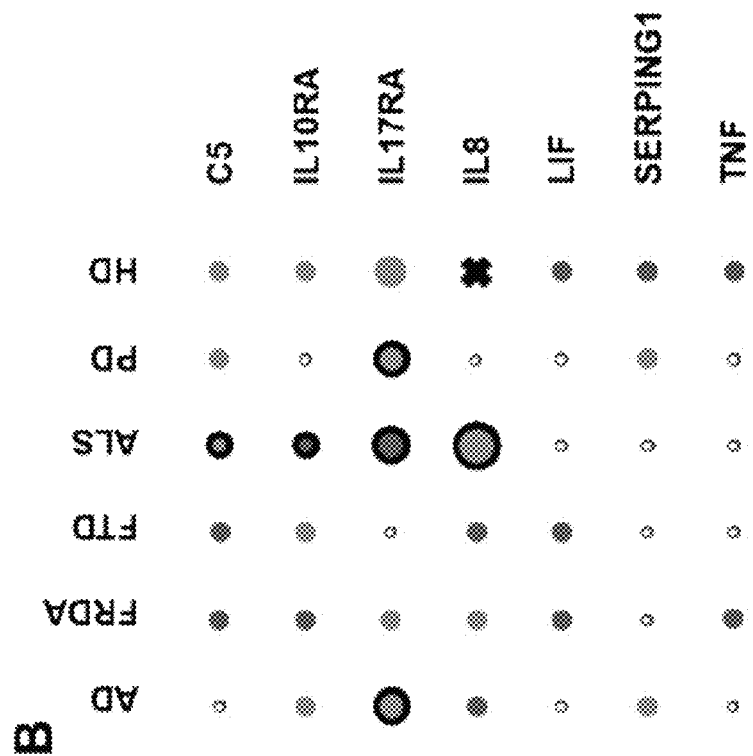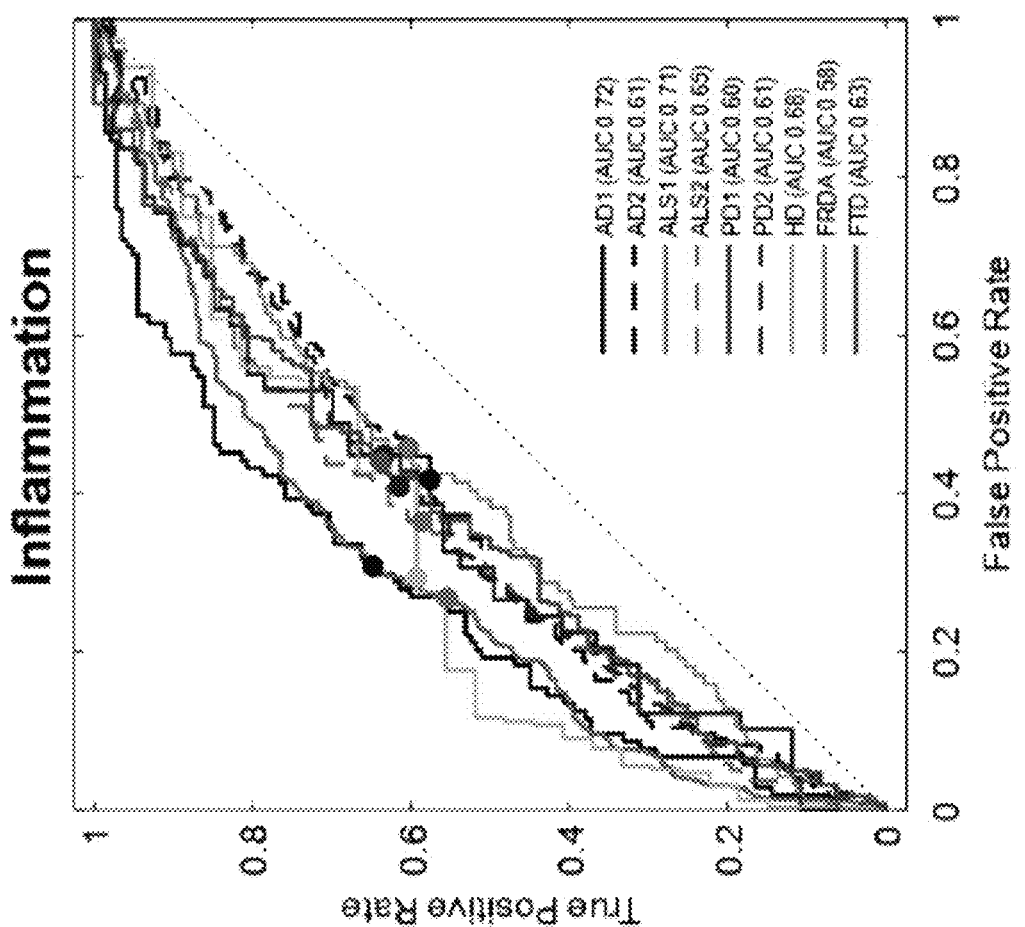
FIG. 2B
FIG. 2A

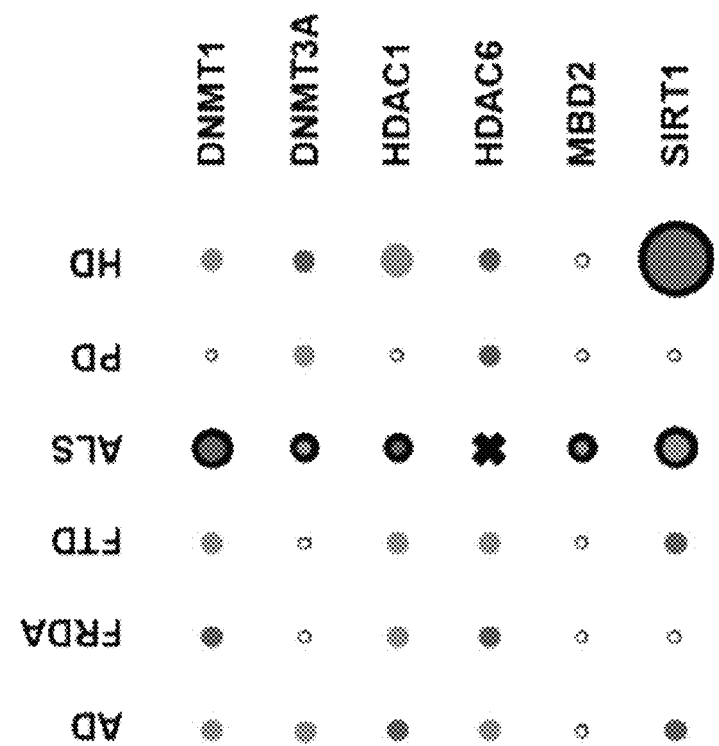
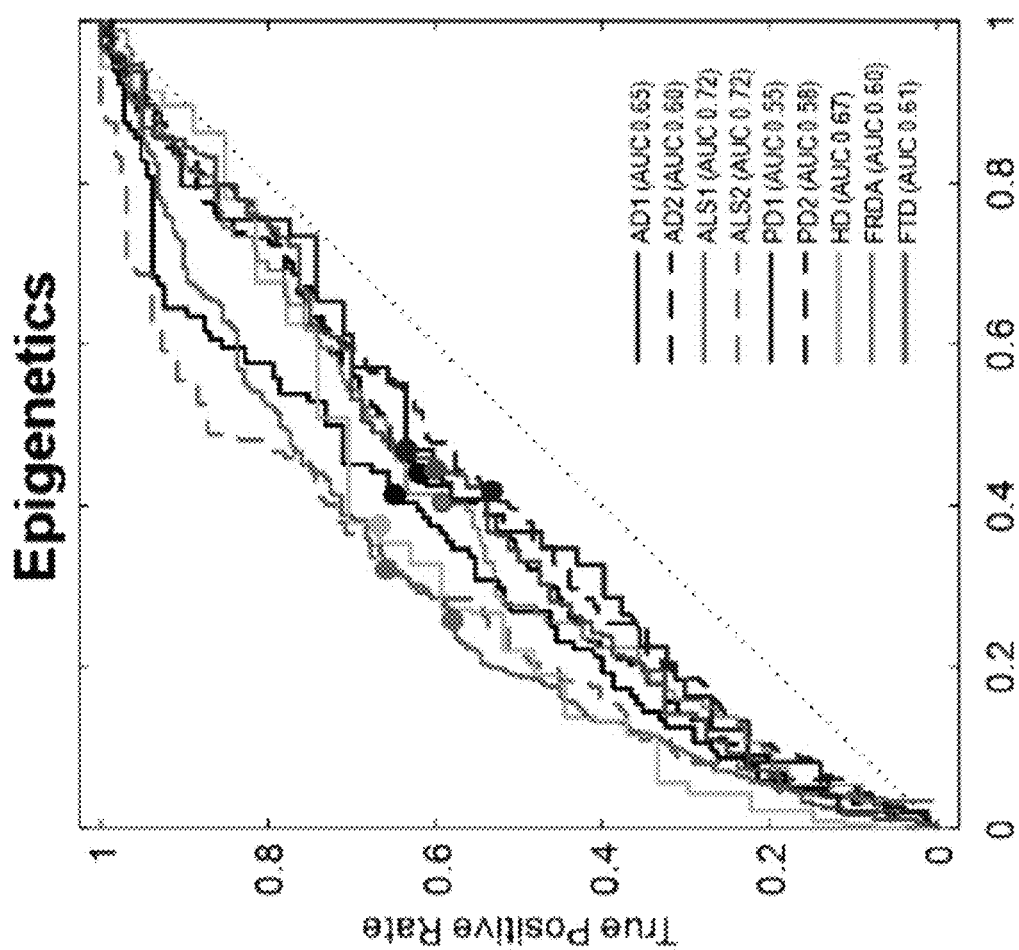
FIG. 2D
FIG. 2C

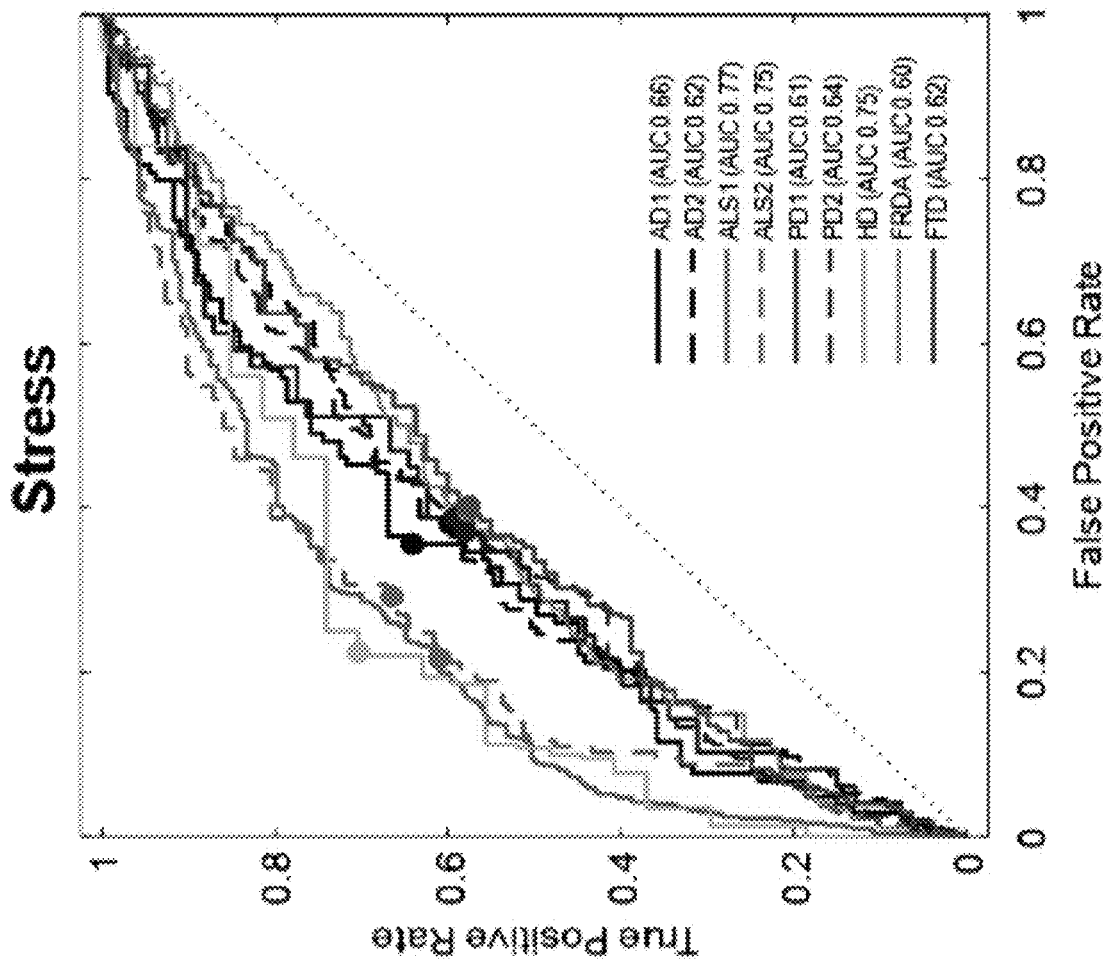
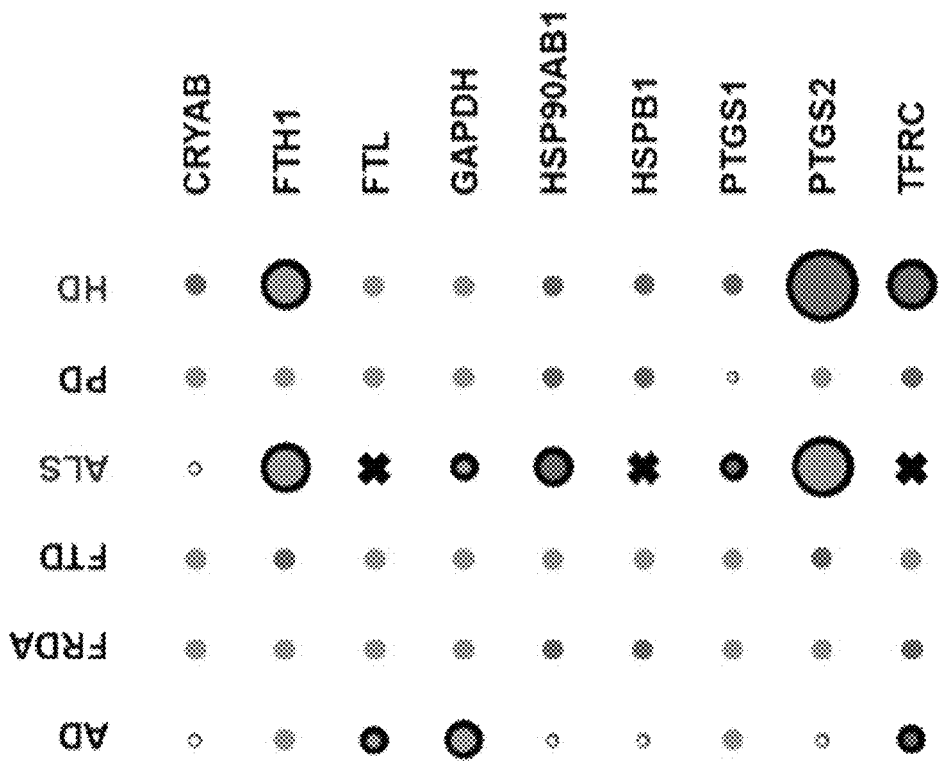
FIG. 2E
FIG. 2F

| | AD | FRDA | FTD | ALS | PD | HD | |
|---|---|---|---|---|---|---|---|
| | ● | · | · | ● | · | · | MRPL51 |
| | ● | · | · | ✖ | ∘ | · | NDUFA1 |
| | ● | · | · | ✖ | · | · | RPL36AL |
| | ● | · | · | ∘ | · | ✖ | NDUFS5 |
| | ● | · | · | ● | · | · | SHFM1 |
| | · | · | · | ∘ | · | · | TFDP1 |
| | ● | · | · | ✖ | · | · | CETN2 |
| | ● | · | · | ● | · | · | ATP5I |
| | ● | · | · | ● | ∘ | ● | ING3 |
| | · | · | · | ● | · | · | STIP1 |
| | ● | · | · | ● | · | ● | SNTB2 |
| | ● | · | · | ● | · | · | AATF |
| | · | · | · | ● | · | · | MED16 |
| | ● | ∘ | · | ● | · | ✖ | APBB3 |
| | ● | · | · | · | · | · | DDIT4 |
| | ● | · | · | ● | · | · | TPM3 |
| | · | · | · | ● | · | · | GRAP |
| | ● | · | · | ● | ● | ● | CMTM2 |
| | ● | · | · | ● | ∘ | · | CDK10 |
| | ● | ✖ | · | ✖ | · | ✖ | LOC646200 |

|  | AD | FRDA | FTD | ALS | PD | HD |  |
|---|---|---|---|---|---|---|---|
|  | ◇ | ● | ● | ✖ | ● | ✖ | DHRS4L2 |
|  | ● | ● | ○ | ● | ● | ● | TSC22D1 |
|  | ● | ● | ● | ● | ● | ● | NSUN7 |
|  | ● | ● | ● | ● | ● | ● | LDLR |
|  | ● | ● | ● | ● | ● | ✖ | C1ORF128 |
|  | ● | ● | ● | ● | ● | ● | HPSE |
|  | ● | ● | ● | ● | ● | ✖ | MEAF6/C1ORF149 |
|  | ● | ● | ● | ● | ● | ● | GEMIN6 |
|  | ● | ● | ● | ✖ | ● | ● | GPR34 |
|  | ● | ● | ● | ● | ● | ● | DAPK2 |
|  | ● | ● | ● | ● | ● | ● | SIAH2 |
|  | ◇ | ◇ | ◇ | ● | ● | ● | ELOVL4 |
|  | ● | ◇ | ◇ | ● | ● | ✖ | OR51S1 |
|  | ◇ | ◇ | ◇ | ● | ● | ✖ | OVCA2 |
|  | ◇ | ● | ● | ● | ● | ◇ | CECR1 |
|  | ● | ● | ● | ● | ● | ● | MFN2 |
|  | ● | ◇ | ◇ | ◇ | ● | ● | PPP1R13L |
|  | ● | ● | ● | ◇ | ● | ✖ | CENPV/PRR6 |
|  | ◇ | ● | ● | ● | ● | ● | ENTPD4 |
|  | ◇ | ◇ | ◇ | ● | ● | ● | THRA |

| | AD | FRDA | FTD | ALS | PD | HD | |
|---|---|---|---|---|---|---|---|
| | ○ | ✖ | ● | · | · | ✖ | METRNL |
| | ● | · | ● | ● | · | · | KLF6 |
| | ● | · | ● | ● | · | · | MS4A7 |
| | · | · | · | ● | · | · | PRDX6 |
| | · | ● | · | ✖ | · | ✖ | DEFA1B |
| | · | · | · | ✖ | · | · | NGFRAP1 |
| | · | · | · | · | · | · | POLR1D |
| | ● | · | ● | · | · | ✖ | SNURF |
| | ● | · | · | ● | · | ● | KLF2 |
| | · | · | · | ● | · | · | FBP1 |
| | · | ● | · | ✖ | · | ✖ | DEFA3 |
| | · | ✖ | · | · | · | ● | ATF6 |
| | ● | · | ● | ● | · | ● | DUSP1 |
| | · | · | · | ● | · | · | RUFY1 |
| | · | · | · | ✖ | ✖ | ✖ | UPLP |
| | · | · | ● | · | · | · | LCN2 |
| | ● | · | ● | · | ● | ● | PPM1F |
| | · | · | · | ● | · | · | PTCRA |
| | ● | ✖ | · | ✖ | ✖ | ✖ | PET100 |
| | · | · | · | · | · | · | FYN |

FIG. 11B

SYSTEMS AND METHODS FOR DIAGNOSING NEURODEGENERATIVE DISEASES VIA MACHINE LEARNING AND BLOOD RNA

CROSS REFERENCE TO RELATED APPLICATIONS

This is a PCT application that claims benefit to U.S. provisional application Ser. No. 63/143,616 filed on Jan. 29, 2021, and further claims benefit to U.S. provisional application Ser. No. 63/250,889 filed on Sep. 30, 2021; all of which are incorporated by reference in their entireties.

GOVERNMENT SUPPORT

This invention was made with government support under T32 AG044402 awarded by the National Institutes of Health. The government has certain rights in the invention.

FIELD

The present disclosure generally relates to computer-implemented methods, devices, and medical diagnosis applications; and in particular to a computer-implemented method of diagnosing a neurodegenerative disease on the basis of transcripts in blood, including, e.g., identification and validation of blood-based RNA biomarkers for neurodegenerative disease to reveal alterations in multiple fundamental cellular processes.

BACKGROUND

Diagnosis of neurodegenerative diseases is notoriously inaccurate. Current methods for diagnosing neurodegenerative disease are either expensive, time-consuming, or invasive. A simple inexpensive and noninvasive method of diagnosis is clearly needed. To achieve this goal, it is important to understand and solve different challenges in the subject technical art.

It is with these observations in mind, among others, that various aspects of the present disclosure were conceived and developed.

SUMMARY

Aspects of the present disclosure may take the form of a computer-implemented method for diagnosing a neurodegenerative disease. In general, the method includes the steps of extracting data from a blood sample associated with a patient; and generating, by a processor, a machine learning prediction of a diagnosis of a neurodegenerative disease afflicting the patient by applying the data from the blood sample as input to a machine learning model in view of a blood RNA transcript predetermined to be predictive of the neurodegenerative disease. In some examples, the machine learning model includes Random Forest (RF) classification and is trained, by the processor, by steps including: accessing whole blood expression datasets associated with the neurodegenerative disease and sample datasets, the sample datasets including whole human blood mRNA gene expressions processed in normalized form; analyzing a transcriptome of each of the sample datasets and ranking an ability of the predetermined blood RNA transcript and each of a plurality of RNA blood transcripts to classify affected samples for a diagnosis of the neurodegenerative disease, training including: building a first plurality of classifier trees, selecting a first set of top classifiers, building a second plurality of classifier trees using the set of top classifiers, and selecting and saving a second set of top classifiers, the second set of top classifiers defining selected transcripts. In some examples, the machine learning model is trained by the processor to optimize selection of transcripts for disease discrimination, by steps of: for each node in a binary classification tree, randomly selecting ⅔ of samples in a test sample set and ordering them by expression of each f randomly selected transcript features; applying a ranking measurement using a Gini index to select a transcript with least impurity at each node to build trees and rank transcript samples to optimize a decision tree; and generating a confusion matrix after classification of the test sample set.

Aspects of the present disclosure may further take the form of a system configured for diagnosing a neurodegenerative disease. In general, the system includes a memory and a processor in operable communication with the memory. The processor, configured with executable instructions stored in the memory, being operable to: access a dataset from a repository, the dataset including gene expression data; normalize the data gene expression data; train an algorithm using machine learning as applied to samples from the dataset; select a set of features to classify samples into disease or control groups based on RNA expression in whole blood; select a subset of the set of features; and implement the algorithm as trained to compute a transcript signature for a neurodegenerative disease based on the subset of the features, the transcript signature indicative of a diagnosis for the neurodegenerative disease.

Aspects of the present disclosure may further take the form of a tangible, non-transitory, computer-readable medium having instructions encoded thereon, the instructions, when executed by a processor, being operable to: access a dataset from a repository, the dataset including gene expression data; normalize the data gene expression data; train an algorithm using machine learning as applied to samples from the dataset; select a set of features to classify samples into disease or control groups based on RNA expression in whole blood; select a subset of the set of features; and implement the algorithm as trained to compute a transcript signature for a neurodegenerative disease based on the subset of the features, the transcript signature indicative of a diagnosis for the neurodegenerative disease.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIGS. 2A-2G are graphs illustrating receiver operator curves for functional group features in Alzheimer's disease (AD) and other neurodegenerative diseases. ROC generated from discrimiant scores of Linear discriminant analysis using functional group features hand-picked in previous work for each of three functional groups: Inflammation (FIG. 2A), Epigenetics (2C), and Stress (2E). FIG. 2G shows ROC for combined analysis of all 22 transcripts of the three groups. Line colors denote specific neurodegenerative diseases tested and line points mark LDA selected threshold for each (FIGS. 2B, 2D, and 2F). Differential expression analysis comparison of features across neurodegenerative diseases. Size of circle denote magnitude of increase in expression (orange) or decrease of expression (blue) in disease. Expression change greater than 1.5 fold falls within the largest dots. A false discovery rate corrected p<0.01 is considered significant and marked where applicable by a black outline. (ROC line color AD in black, HD in cyan or light blue, FRDA in orange, PD in dark blue, ALS in pink, FTD in red, AUC-area under curve probability for predicting classification of disease).

FIGS. 3A-3D are graphs illustrating generation of Random Forest Transcript Sets from AD Whole-Blood Gene Expression Data. ROC generated from discrimiant scores of Linear discriminant analysis using the top 20 transcript Random forest selections when training on (FIG. 3A) GSE63060 AD1 model #55 with sensitivity 78% (left) and training on (FIG. 3C) GSE63061 AD2 model #24 with sensitivity 87% (right). Line colors denote specific neurodegenerative diseases tested using the AD transcripts and line points mark LDA selected threshold for each (FIGS. 3B and 3D). Differential expression analysis between disease and controls for each neurodegenerative disease comparison of features across the diseases. The 20 transcripts of FIG. 3B classify AD, ALS and HD while the 20 transcripts of FIG. 3D classified AD and HD. Size of circle denote magnitude of increase in expression (orange) or decrease of expression (blue) in disease. Expression change greater than 1.5 fold falls within the largest dots. A false discovery rate corrected p<0.01 is considered significant and marked where applicable by a black outline. (ROC line colors AD, HD, FRDA, PD, ALS, FTD AUC-area under curve probability for predicting classification of disease).

FIGS. 8A-8D depict graphs and analyses indicating that random forest selected transcripts distinguish Amyotrophic lateral sclerosis from healthy controls: FIG. 8A shows receiver operator curves calculated from discriminant scores generated by Linear discriminant analysis for Random forest selected transcript subset model #33 with sensitivity 74% trained on GSE112676 (ALS1) and testing GSE112680 (ALS2). LDA midpoint cutoff indicated on curves by solid dot. FIG. 8B shows differential expression analysis for the ALS1 top twenty transcripts for disease samples and associated healthy controls for each disease using R limma package. Size of dot represents magnitude of differential expression value with orange increased expression in disease and blue decreased. Expression greater or less than 1.5 fold-change marked by largest darker dots. Dots with black outline show significant p<0.01 false discovery rate corrected. FIG. 8C show the top twenty Random forest transcript picks to select ALS2 from controls. Training on GSE112680 and tested on GSE112676. RF model #98 was selected with sensitivity 91%. Receiver operator curves calculated from discriminant scores generated from Linear discriminant analysis. LDA midpoint cutoff indicated on curves by solid dot. FIG. 8D shows differential expression analysis for the ALS2 top twenty transcripts for disease samples and associated healthy controls for each disease using R limma package. Size of dot represents magnitude of differential expression value where orange is increased expression in disease and blue decreased. Expression greater or less than 1.5 fold-change marked by largest darker dots. Dots with black outline show significant p<0.01 false discovery rate corrected.

FIGS. 9A-9D depict graphs and analyses illustrating random forest selected transcripts distinguish Parkinson's disease from healthy controls. A) Top twenty Random forest transcript picks to select PD1 from controls. Trained and tested within GSE57475. Model #71 was selected with sensitivity 94%. Receiver operator curves calculated from discriminant scores generated by Linear discriminant analysis. LDA midpoint cutoff indicated on curves by solid dot. B) Differential expression analysis for the PD1 top twenty transcripts for disease samples and associated healthy controls for each disease using R limma package. Size of dot represents magnitude of differential expression value with orange increased expression in disease and blue decreased. Expression greater or less than 1.5 fold-change marked by largest darker dots. Dots with black outline show significant p<0.01 false discovery rate corrected. C) Top twenty Random forest transcript picks to select PD2 from controls. Trained and tested within GSE99039. Model #74 was selected with sensitivity 60%. Receiver operator curves calculated from discriminant scores generated from Linear discriminant analysis. LDA midpoint cutoff indicated on curves by solid dot. D) Differential expression analysis for the PD2 top twenty transcripts for disease samples and associated healthy controls for each disease using R limma package. Size of dot represents magnitude of differential expression value where orange is increased expression in disease and blue decreased. Expression greater or less than 1.5 fold-change marked by largest darker dots. Dots with black outline show significant p<0.01 false discovery rate corrected.

FIGS. 10A-10B are graphs and analysis showing random forest selected transcripts distinguish Huntington's disease from healthy controls. A) Top twenty random forest transcript picks to select HD from controls. Trained and tested within GSE99039. Model #48 was selected with sensitivity 83%. Because the number of transcripts cannot be larger than the number of samples in the test set (18 test samples), receiver operator curves of discriminant scores generated from Linear discriminant analysis performed on the top ten transcripts only (red font). LDA midpoint cutoff indicated on curves by solid dot. B) Differential expression analysis on the HD top twenty transcripts for disease samples and associated healthy controls for each disease R limma package. Size of dot depicts magnitude of differential expression value where orange is increased expression in disease and blue decreased. Expression greater or less than 1.5 fold-change marked by the largest dots. Dots with black outline show significant p<0.01 false discovery rate corrected.

FIGS. 11A-11B are graphs and analysis showing random forest selected transcripts distinguish behavioral variant frontotemporal dementia from healthy controls. A) Top twenty random forest transcript picks to select FTD from controls. Trained and tested within GSE140830. Model #25 was selected with sensitivity 71%. Receiver operator curves of discriminant scores generated from Linear discriminant analysis. LDA midpoint cutoff indicated on curves by solid dot. B) Differential expression analysis on the FTD top twenty transcripts for disease samples and associated healthy controls for each disease using R limma package. Size of dot depicts magnitude of differential expression value with orange increased expression in disease and blue decreased. Expression greater or less than 1.5 fold-change marked by largest darker dots. Dots with black outline show significant p<0.01 false discovery rate corrected.

Figure 1A:
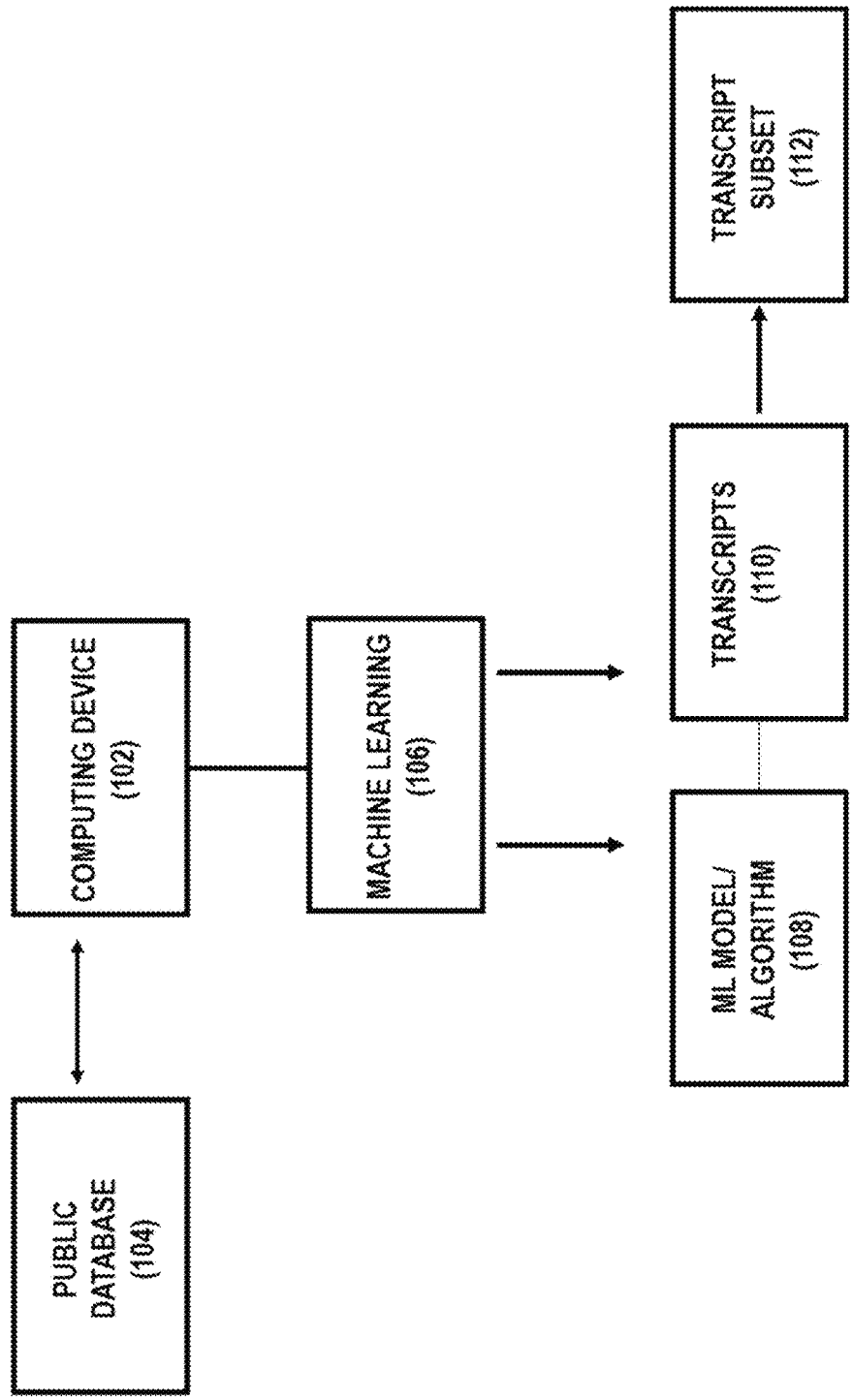
FIG. 1A is a simplified illustration of a computer-implemented system and devices for diagnosing a neurodegenerative disease, according to aspects of the present disclosure.

In addition, a "Supplemental (Transcript) Worksheet" is being filed with the present application and is referenced herein.

Corresponding reference characters indicate corresponding elements among the view of the drawings. The headings used in the figures do not limit the scope of the claims.

DETAILED DESCRIPTION

As described herein, the present disclosure relates to computer-implemented methods for diagnosing a neurodegenerative disease and associated systems devices. More specifically, machine learning is leveraged via one or more computing devices or processing elements in view of transcripts present in blood to discover sets of transcripts which perform sufficiently or are otherwise suitable for distinguishing a number of neurodegenerative diseases in view of new samples. Overall, the object is to select a small set of transcripts which can robustly distinguish neurodegenerative diseases.

General Introduction

Diagnosis of neurodegenerative diseases is often uncertain, and many current methods are expensive, time-consuming, or invasive. These issues have led to significant interest in blood as a potential biomarker. The present disclosure posits that flexible machine learning analysis of the blood transcriptome for six neurodegenerative diseases can provide useful diagnostic information. As described herein, the affected components of the blood transcriptome represent fundamental cell biological processes that are also affected in the brain.

Methods: For analysis, nine data expression datasets were selected representing six neurodegenerative diseases with 3,490 samples. A machine learning Random Forest (RF) algorithm was used to analyze the transcriptome of each dataset. Hypothesis-based transcripts were also tested from a previous analysis. RNA transcripts selected by RF were then classified by pathway analysis.

Results: RF analyses ranked the blood transcript ability to classify affected samples from healthy controls for six neurodegenerative diseases while highlighting similarities and differences across the diseases. Classifying transcripts selected for each disease studied can be grouped into eight cellular processes including transcription regulation, degranulation, immune response, protein synthesis, apoptosis, cytoskeleton components, ubiquitylation/proteasome, and metabolomic complexes.

Discussion: In addition, the usefulness of blood RNA transcriptomics for classification of neurodegenerative diseases was validated. Pathway analysis of transcripts selected by machine learning reveal that neurodegenerative diseases affect basic cellular processes in blood cells and that these basic processes reveal common themes which after removal, bare the unique transcripts of each disease.

1.0 SYSTEM EXAMPLES

Neurodegenerative diseases, including Alzheimer's disease (AD) are complex and typically rely upon clinical recognition of a characteristic set of symptoms supported by diagnostic tests that are meant more to rule out mimics than to positively confirm clinical impressions. Not surprisingly therefore, in a recent study, it was noted that AD has a misdiagnosis rate of about one in four even at top dementia centers. Because AD symptoms can overlap with common causes of altered cognition, some of which are treatable or reversible (for example polypharmacy related chronic drug intoxication), an accurate diagnosis at the earliest time is important.

Typically, clinical assessment is supported by Magnetic Resonance Imaging (MRI), and occasionally Positron emission tomography (PET), such as 18F-fluorodeoxyglucose (FDG) assessment of glucose metabolism, especially when there is a competing concern for possible frontotemporal dementia. In research settings measurement of Aβ plaque burden in brain using PIB, and tau neurofibrillary tangle burden with flortaucipir F18 can provide more direct evidence of AD pathology, but due to their high cost, lack of insurance coverage, and inaccessibility these are rarely performed in a purely clinical setting. Additional biomarker tests which are more widely utilized clinically include cerebral spinal fluid (CSF) assessment of Aβ clearance, total tau levels, and phosphorylated tau. The expense and/or invasive nature of these measures has led to increasing interest in less invasive, less expensive biomarkers of neurodegenerative disease. Blood biomarkers are especially interesting having low cost, minimal invasiveness, and wide accessibility. A wide variety of blood tests have been proposed, based on protein, RNA and other classes of potential biomarkers. Applicable AD blood-based tests are emerging targeting relative measurements of Aβ related species or accumulation of specific tau protein phosphorylation. Neurodegenerative diseases are associated with changes in specific molecular pathways and involve metabolomic and biological processes active in both the central nervous system (CNS) and vascular peripheral system. A machine learning study of blood-based changes was implemented in the entire blood transcriptome to differentiate neurodegenerative diseases. Using the entire blood transcriptome can also provide information for a pathophysiological relationship with disease and gives us the advantage of using the vast knowledge of gene expression to not only distinguish disease but also analyze the pathways affected. With expression platforms of more than 30,000 probes covering 10,000 genes, a blood test could be constructed to not only differentiate AD but also other diseases.

Figure 1B:
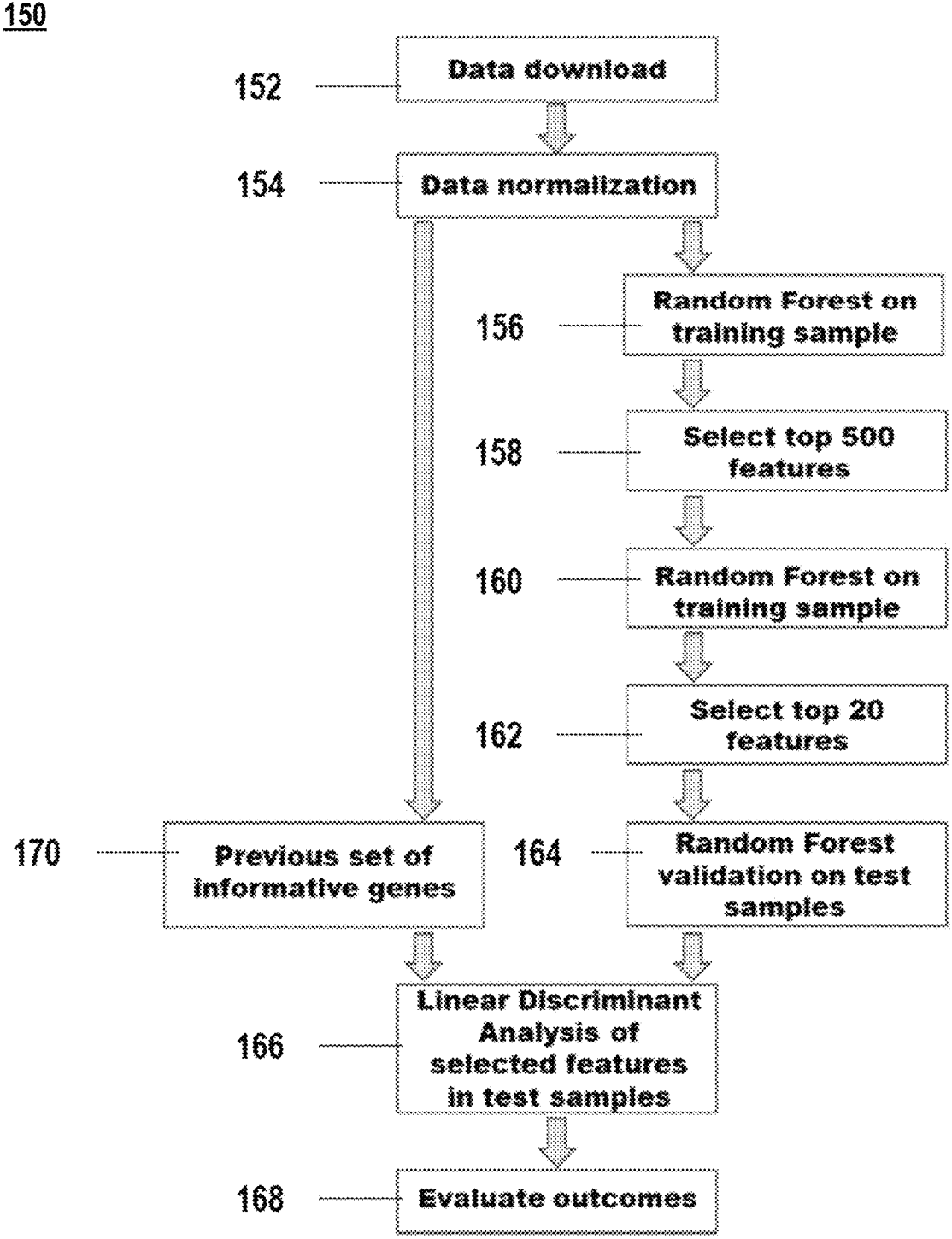
FIG. 1B is a simplified block diagram of a computer-implemented process for a neurodegenerative disease, according to aspects of the present disclosure.

Referring to FIG. 1A, a system 100 is illustrated including a computing device 102 configured for predicting and/or diagnosing a neurodegenerative disease; and FIG. 1B illustrates an exemplary process 150 executable by the computing device 102 for selection of predictive transcripts that may be made ad hoc from empirical data research, wherein a machine learning algorithm executed by the computing device 102 generates new predictive transcripts for classifying disease from healthy controls. In some examples, the computing device 102 takes the form of the device indicated in FIG. 13, and includes at least one processor or processing element, a memory of the computing device 102 (or separately implemented), a network interface (or multiple network interfaces), and a bus (or wireless medium) for interconnecting the aforementioned components. The network interface includes the mechanical, electrical, and signaling circuitry for communicating data over links (e.g., wired or wireless links) associated with a network (e.g., the Internet, a Bluetooth connection, a local area network (LAN), and the like). The network interface may be configured to transmit and/or receive the signal data using a variety of different communication protocols, as will be understood by those skilled in the art.

In general, existing data from one or more public databases 104 residing in storage, web servers, or other devise, is leveraged by the computing device 102 during machine learning to develop and implement an algorithm 108 (aspects of the algorithm more fully detailed in FIG. 1B and described below) by one or more processing elements of the computing device 102. A modification to various existing machine learning (106) algorithms was made to generate small sets of transcripts 110 that diagnose each neurodegenerative disease (see as a non-limiting example, "Mathematical analysis techniques." Leo Breiman, Machine Learning 45, 5-32, 2001).

In some examples, a Random Forest algorithm is used to select top variables to classify samples into disease or control groups based on RNA expression in whole blood. For example, in one trial example, generating 100 models of the top 20 transcript variables, the model with the highest sensitivity and specificity is selected to classify the blood samples into disease or control. The random forest algorithm is innately random and by taking advantage of this property and generating 100 models of twenty transcripts each, the top transcripts (transcript subset 112) favored by the algorithm 108 can be captured and leveraged. By this method, a transcript signature can be produced for each neurodegenerative disease and that signature has utility for diagnosis.

In other words, using existing public datasets 104, a machine learning algorithm 108 is developed for application by the computing device 102 on transcripts 110 present in blood to identify a small sets of transcripts (transcript subset 112) which distinguish a number of neurodegenerative diseases with high sensitivity and specificity. Neurodegenerative diseases such as AD are associated with changes in specific molecular pathways and signatures. Using RNA expression as blood biomarkers can also provide information for a pathophysiological relationship with disease and gives us the advantage of using the vast knowledge of gene expression to not only predict disease but also analyze the pathways involved. Chosen transcripts (transcript subset 112) reveal that neurodegenerative diseases have common themes which after removal bare the unique transcripts of each disease.

It is contemplated that the various functions described herein including the functions of FIG. 1B may include any number of components or modules executed by the computing device 102 or otherwise implemented. Accordingly, in some examples, one or more functions of FIG. 1B may be implemented as code and/or machine-executable instructions executable by the computing device 102 that may represent one or more of a procedure, a function, a subprogram, a program, a routine, a subroutine, a module, an object, a software package, a class, or any combination of instructions, data structures, or program statements, and the like. In other words, one or more of the functions of FIG. 1B described herein may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium (e.g., the memory), and the processor of the computing device 102 performs the tasks defined by the code.

Additional examples and details associated with and/or related to the process 150 of FIG. 1B are described below. In particular, initial blood transcriptome work associated with the present disclosure was able to distinguish AD, PD, and control brain and was reproducible across multiple replicates and platforms. The transcript selection was hypothesis driven and evaluated on custom cDNA arrays and qPCR. Significant success was found using multivariate analysis on previous transcript predictors belonging to cell stress, inflammation, and epigenetics. Public datasets were utilized to both attempt to validate earlier transcript picks as well as apply machine learning techniques to these same published data to discover groups of transcripts that not only classify disease but also guide discovery of affected pathways. Machine learning techniques based on classification of transcriptional expression data between multiple diseases and/or non-disease have been successfully applied to differentiate cancer types and subtypes such as that encountered in the large group of small-blue-round-cell tumor cancers. Information about features selected for the classification may also guide insight into possible treatment strategies.

In the following text, the aim is to validate previous transcript picks using new datasets and it was found that a complete set of these transcripts performs equally well or better at discriminating between clinical AD and age/sex-matched nondemented individuals than was described in earlier work providing proof of concept of the practical use in a blood screening test. The transcript discovery was expanded using a RF algorithm to derive supervised predictors of different neurodegenerative diseases with the aim of generating transcriptional clusters able to make clinical group discriminations which are unique to each of the six diseases studied. Machine learning selection of transcript classifiers reveal that neurodegenerative diseases have common themes and individual differences unique to each disease. Molecular components which overlap across diseases were considered neurodegeneration generalities and differential components identified by the predictor transcripts were searched.

2.0 EXEMPLARY METHODS

2.1 Data Acquisition

Referring to block 152 of process 150 shown in FIG. 1B, publicly available whole blood expression datasets of six neurodegenerative diseases were searched for and selected from the Gene Expression Omnibus (GEO) (https://www.ncbi.nlm.nih.gov/geo/) repository up to December 2020 for analysis including AD, idiopathic Parkinson's Disease (PD), Amyotrophic lateral sclerosis or Lou Gehrig's disease (ALS), Friedreich's ataxia (FRDA), behavioral variant Frontotemporal dementia (FTD), and Huntington's Disease (HD). Choices were limited to large whole-blood transcript datasets publicly available at the time of this study. The data sets were chosen using the following criteria: 1) RNA extracted from whole blood collected in Paxgene tubes; 2) data set must contain at least one hundred human subjects; and 3) data was generated on the GPL15988nuID (Illumina HumanHT-12 V4.0 expression beadchip), GPL10558 (Illumina HumanHT-12 V4.0 expression beadchip), GPL6947 (Illumina HumanHT-12 V3.0 expression beadchip), or GPL570 ([HG-U133_Plus_2] Affymetrix Human Genome U133 Plus 2.0) microarray expression platforms. These platforms contain greater than 20,000 gene probes and provide overlapping transcripts to ensure comparison across models generated. Meta-analysis was performed on ten cohorts (GEO datasets GSE63060 (AD1), GSE63061 (AD2), GSE140829 (AD3), GSE57475 (PD1), GSE99039 (PD2 and HD), GSE112676 (ALS1), GSE112680 (ALS2), GSE102008 (FRDA), and GSE140830 (FTD)) with a total of 3490 samples. Cohort details are tabulated in Table 1 below.

TABLE 1

Characteristics of RNA expression data sets used in this study. HC—healthy control, AD—Alzheimer's disease, MCI—mild cognitive impairment, PD—Parkinson's disease, ALS—amyotrophic lateral sclerosis, MIMIC—diseases mimicking ALS, FRDA—Friedreich's ataxia, CARRIERS—heterozygous unaffected carriers of FRDA, bvFTD—behavioral variant frontotemporal dementia, nfvPPA—nonfluent variant primary progressive aphasia, PSP—progressive supranuclear palsy, svPPA—semantic variant primary progressive aphasia, CBS—corticobasal syndrome. Dates reflect data submission to GEO and last update since Nov. 24, 2020.

|  | GEO dataset | description | Samples | Gender | platform |
|---|---|---|---|---|---|
| AD1 | GSE63060 | AD MCI HC AddNeuroMed Cohort (batch 1) Western European/Caucasian Whole blood | 329 samples: 104 HC 145 AD 80 MCI | 62F 42M 99F 46M 39F 41M | GPL6947 Illumina HumanHT-12 V3.0 expression beadchip |
| AD2 | GSE63061 | AD MCI HC AddNeuroMed Cohort (batch 2) Western European/European mix Whole blood | 382 samples: 134 HC 139 AD 109 MCI | 81F 53M 85F 54M 65F 44M | GPL10558 Illumina HumanHT-12 V4.0 expression beadchip |
| PD1 | GSE57475 | PD HC Blood a-synuclein, gene expression and smell testing as diagnostic and prognostic biomarkers in PD study from 22 US tertiary care centers. Whole blood | 142 samples 49 HC 93 PD - Dopamine transporter imaging confirmed. | 23F 26M 31F 62M | GPL6947 Illumina HumanHT-12 V3.0 expression beadchip |
| PD2 HD | GSE99039 | PD HC HD other GENEPARK consortium Whole blood | 558 samples: 233 healthy control (HC) 205 idiopathic Parkinson's Disease (PD) 27 Huntington's Disease (HD) 22 Genetic PD unaffected (GENUA) 41 Genetic PD affected (GPD) | 142F 70M 21NA 90F 101M 14NA 11F 8M 8NA 8F 11M 3NA 19F 22M 11F 12M | GPL570 (HG-U133_Plus_2) Affymetrix Human Genome U133 Plus 2.0 Array |

TABLE 1-continued

Characteristics of RNA expression data sets used in this study. HC—healthy control, AD—Alzheimer's disease, MCI—mild cognitive impairment, PD—Parkinson's disease, ALS—amyotrophic lateral sclerosis, MIMIC—diseases mimicking ALS, FRDA—Friedreich's ataxia, CARRIERS—heterozygous unaffected carriers of FRDA, bvFTD—behavioral variant frontotemporal dementia, nfvPPA—nonfluent variant primary progressive aphasia, PSP—progressive supranuclear palsy, svPPA—semantic variant primary progressive aphasia, CBS—corticobasal syndrome. Dates reflect data submission to GEO and last update since Nov. 24, 2020.

|   | GEO dataset | description | Samples | Gender | platform |
|---|---|---|---|---|---|
|   |   |   | 30 MSA, PSP and other neurodegenerative disease | 7NA |   |
| ALS1 | GSE112676 | ALS HC Tertiary referral center for motor neuron diseases University Medical Center Utrecht, The Netherlands. Whole blood at diagnosis | 741 samples: 508 HC 233 ALS 143 spinal 90 bulbar | 230F 278M 90F 143M 48F 95M 42F 48M | GPL6947 Illumina HumanHT-12 V3.0 expression beadchip |
| ALS2 | GSE112680 | ALS HC MIMICS Whole blood | 376 samples: 137 HC 164 ALS 108 spinal 56 bulbar 75 MIMICS | 58F 79M 68F 96M 31F 77M 37F 19M 17F 58M | Illumina GPL10558 HumanHT-12 V4.0 expression beadchip |
| FRDA | GSE102008 | FRDA HC CARRIERS UCLA and Children's Hospital of Philadelphia Whole blood | 733 samples: 94 HC 411 FRDA 228 CARRIERS | 40F 54M 192F 219M 141F 87M | Illumina GPL10558 HumanHT-12 V4.0 expression beadchip |
| FTA | GSE140830 | bvFTD HC other dementia UCLA, UCSF Whole blood | 542 samples 281 HC 80 bvFTD 47 nfvPPA 54 PSP 44 svPPA 36 CBS | 156F 125 M 35F 45M 28F 19M 29F 25M 21F 23M 20F 16M | GPL15988 Illumina HumanHT-12 V4.0 expression beadchip nulD |
| AD3 | GSE140829 | AD MCI HC UCLA, UCSF Whole blood | 587 samples 249 HC 204 AD 134 MCI | 104F 100M 139F 110 M 62F 72M | GPL15988 Illumina HumanHT-12 V4.0 expression beadchip nulD |

2.2 Data Normalization

Figure 6:
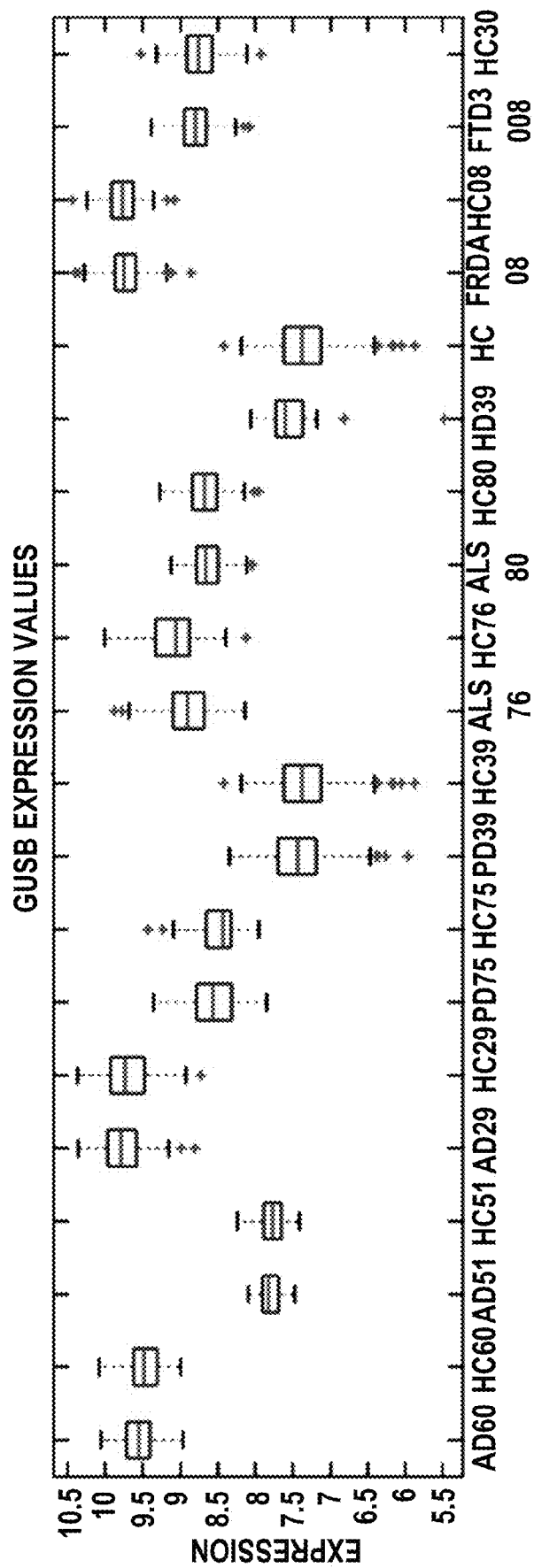
FIG. 6 is a boxplot analysis of Glucuronidase Beta (GUSB) expression values for each cohort, as described herein. GUSB expression shows no significant difference between disease and healthy controls and was used to scale data sets prior to RF analysis. GUSB expression values for each cohort were subjected to boxplot analysis with red line at the mean and outliers red plus for each group of disease labeled as AD, PD, ALS, HD, FRDA, and FTD. Healthy controls (HC) for each cohort labeled along with the last two digits of GSE dataset identification number. Although the variation of GUSB mean expression between cohorts is noted suggesting technical differences between data collection and analyses efforts, the variation for disease and healthy controls within each cohort is not significant except that of the cohort ALS76 (ALS1).

Referring to block 154 of FIG. 1B, blood RNA expression data sets were downloaded and processed in normalized form. Within each dataset each sample's respective GUSB (accession NM_000181.2) expression level was used to ensure normalization of samples was identical to that used for normalization in previous blood work. GUSB is commonly used in laboratory experiments to normalize data and is found to be most consistently unchanged in neurodegenerative disease (FIG. 6).

To standardize the transcript selection across all datasets, transcript matching and sorting was done by specific platform probe identifier when possible to ensure that each Random Forest (RF) analysis was conducted on identical transcript lists. It was anticipated that platform-specific effects would be present as well as batch-effects for each cohort. Data was analyzed from each platform separately and integrated the individual outcomes for further functional analysis comparison. Both LDA and RF analysis were performed on data from each platform separately. Transcript predictors were compared across diseases to identify biological process similarities and focus on molecular process differences. Mapping between Illumina and Affymetrix platforms on accession number is problematic due to multiple accession numbers for which probes only exist on one platform. For this reason, mapping between platforms was done from different manufactures at the gene level. Without an exact sequence match, all probes identified as one EntrezID were then averaged.

2.3 Microarray Gene Differential Expression Profiling

Whole human blood mRNA gene expression datasets were subjected to R limma package adjusted by age and sex to quantify the expression changes in disease. All data were taken as normalized by contributing lab and verified log 2 transformed before analysis. Expression differences were made using an empirical Bayesian statistic (implemented as eBayes in the limma package with adjusted p-value false discovery rate (FDR) in Benjamin-Hochberg style) for each transcript and used for subsequent pathway analysis. For change in expression dot-plots, for example FIG. 2B, the differential expression between disease and controls is represented on a linear scale (0-0.585) by dot size for magnitude of change and color indicating direction of change. All values, when available, were included in dot plots regardless of significance cutoffs (significant differential expression ≥abs(±1.5) log 2 fold change (≥abs(±0.585)); reject $H_0$, FDR p≤0.01). When two datasets were available for one disease (AD, ALS, PD), the most significant differential value was used. In the case of multiple probes, only those probes currently active under the NCBI database were considered.

2.4 Random Forest (RF) Classification

Referring to block 156 of FIG. 1B, a random forest classifier builds an ensemble of many classifier trees, where the final prediction for a test sample is obtained by majority vote on the combination of predictions of all trees. A modification on the Matlab (Mathworks, R2020b) implementation of random forests was used, an ensemble machine learning algorithm from the work of Leo Breiman and others. In this non-limiting example, an individual tree is built by first selecting a training set of n random samples with replacement from N available samples referred to as bootstrap sampling. The bootstrap sampling procedure excludes approximately one third of the samples in the tree building training set. These out-of-bag samples will be used as internal test predictors and an internal estimate of the generalization error of the random forest can be calculated. A small subset (f) of transcript features (F), $f=\sqrt{F}$, are selected at random to partition each binary node in the tree according to the weighted Gini impurity index $(1-\Sigma_{i=1}^{n}p_i^2)$ which measures the likelihood of misclassification. This index also provides a method to assess the relative importance of features in the classification. The gathered predictions made from the resultant collection of trees created from the bootstrap sampling is called bagging, using the Matlab function treebagger.

One hundred classifying sessions were made in a four-step process (FIG. 1B) of which a new random seed was generated before each session and the top predicting session(s) were selected. In a non-limiting example: Step 1) build 1000 trees, Step 2) select top 500 classifiers, Step 3) build 5000 trees using top 500 feature classifiers, and Step 4) select and save top 20 classifiers with test set validation in confusion matrix format. Next repeat steps 1-4 each time with a new random seed to ensure complete feature selection randomization. The top ranked features with highest sensitivity selected from 100 models were combined for further analysis. Random forest classification for single datasets was made by random 80/20 separation of a training and test set where 20% of the samples from each class were removed prior to analysis and used for the validation step after random forest classification and selection of transcript predictors. For the selection of AD and ALS predictors, we were able to use whole datasets sets (i.e., GSE63060 (AD1) with GSE63061 (AD2) and GSE112676 (ALS1) with GSE112680 (ALS2) whole blood expression data), one set was used for training while the other set the test data and vice versa.

2.5 Linear Discriminant Analysis (LDA)

The normalized data for the selected sets of transcript classifiers were analyzed by multivariate discriminant analysis GB-STAT v.10 (Dynamic Microsystems, Inc., Silver Springs, MD, USA.). Linear discriminant analysis is a generalization of Fisher's linear discriminant and maximizes the separability among the two categories. A linear discriminant function (weighted sums of the transcripts) was computed for maximum separability of the two groups where the coefficients or discriminant scores are used to classify as disease or controls. Geometrically the classification decision is simply a matter of which side of the hyperplane defined by a projection vector a sample lies on. The null hypothesis is that the canonical correlation is zero showing that there is no linear relationship between the transcript predictors and the grouping variable. Wilks' lambda is calculated as 1-canonical correlation2 so one expects better separation between controls and disease when Wilks' lambda is close to zero. It follows that the F-ratio of two mean square values and if the null hypothesis is true (the data are sampled from populations with the same mean), F should be close to 1.0 whereas a large F-ratio means that the variation among the group means if more than you expect to happen by chance or in the case when random sampling happened to generate large values in some groups and small values in others. Limitations for LDA include a sensitivity to outliers and the number of features must be less than the number of samples.

2.6 Integrated Method of Pathway Analysis

In some examples, STRING-db version 11.0, Cytoscape opensource network integration and visualization software may be leveraged, and the commercial suite Ingenuity Pathway Analysis (IPA®, QIAGEN redwood City) software to perform pathway analysis. All Random Forest selected gene names from each disease were combined and analyzed to perform biological and molecular approaches for grouping transcript processes and find similarities and differences across diseases. Data set expression values were analyzed individually within each disease rather than merge datasets with inconsistent probes and the outcome of each subjected to comparison analysis looking for similarities and differences among six neurodegenerative diseases. Significance of canonical pathways were selected at Benjamin-Hochberg adjusted p≤0.01. The transcripts selected by machine learning were subjected to classification testing by linear discriminant analysis (LDA) for each disease. Rather than match transcripts exactly, a biological and molecular approach was used to group functional processes revealed by the selected transcripts. Using an integrative method of functional analysis on summary statistics generated from each cohort avoids the complexities of merging datasets generated from multiple labs on different microarray platforms.

3.0 RESULTS

3.1 Additional Samples Validate Ability of Literature-Based Transcripts to Distinguish Alzheimer's' Disease We previously published data indicating the ability of transcripts or features discovered using literature survey to distinguish Alzheimer's disease in RNA blood samples. In this work, feature selection was guided by evidence-based empirical data and the AD literature available at that time. Twenty-two transcripts previously selected (Table 2), representing genes from three different functionally relevant mechanisms in AD (inflammation, epigenetics, and stress), were subjected to linear discriminant analysis (LDA) on expression values collected from whole blood. Inspection of the significance and separation between the classes is measured as Wilks' Λ which is a ratio of the class variations (Λ=|E|/|H+E|) where E is the determinant of a matrix of variations within classes and H the determinant of a matrix of variations between the two classes of disease samples and controls. A number Λ close to zero with a significant p-value suggests the LDA made an excellent separation of the classes distinguishing disease samples and controls. We found that for the groups of transcripts that were able to classify disease from controls at greater than 70% of the time (the seven stress transcripts and all 22 transcripts together) that $\Lambda$ was in general less than 0.8 with F-ratio significant $p<0.05$ in agreement with successful area under the curve (AUC) values reported. The LDA analysis statistics across six neurodegenerative diseases tested with the three functional groups are tabulated in Table 3.

TABLE 2

List of original set of Alzheimer's disease discriminating transcripts

| Name | | Function |
|---|---|---|
| Inflammation | | |
| C5 | Complement C5 | Component innate immune system |
| IL10RA | Interleukin 10 receptor subunit alpha | Cell surface receptor IL10 anti-inflammatory function |
| IL17RA | Interleukin 17 receptor A | Receptor IL17A and IL17F proinflammatory cytokine |
| IL8 | CXC Motif chemokine ligand 8 | CXC chemokine mediator of inflammatory response |
| LIF | LIF Interleukin 6 family cytokine | Pleiotropic cytokine |
| SERPING1 | Serpin Family G member 1 | Regulation of complement cascade |
| TNF | Tumor Necrosis Factor | Multifunctional proinflammatory cytokine |
| Epigenetics | | |
| DNMT1 | DNA methyltransferase 1 | Gene regulation maintains methylation patterns |
| DNMT3A | DNA methyltransferase 3 alpha | de novo methylation |
| HDAC1 | Histone Deacetylase 1 | Gene expression regulator cell proliferation |
| HDAC6 | Histone Deacetylase 6 | Transcription repressor |
| MBD2 | Methyl-CpG binding domain protein 2 | Transcription repressor |
| SIRT1 | Sirtuin 1 | Transcription repressor |
| Stress | | |
| CRYAB | Crystallin alpha B | Stress activated chaperone-like protein |
| FTH1 | Ferritin Heavy chain 1 | Component of Ferritin iron storage protein |
| FTL | Ferritin Light chain | Component of Ferritin iron storage protein |
| GAPDH | Glyceraldehyde-3-Phosphate Dehydrogenase | Glycosis and nuclear functions |
| HSP90AB1 | Heat shock protein 90 alpha class B member 1 | Protein folding and degradation |
| HSPB1 | Heat shock protein Family B (small) member 1 | Stress activated chaperone protein folding |
| PTGS1 | Prostaglandin-Endoperoxide Synthase 1 | Catalyzes conversion arachinodate to prostaglandin - angiogenesis |
| PTGS2 | Prostaglandin-Endoperoxide Synthase 2 (cyclooxygenase) | Prostaglandin biosynthesis |
| TFRC | Transferrin receptor | Cell surface receptor iron uptake by endocytosis |

TABLE 3

LDA statistics for original Alzheimer's disease discriminating transcripts

| 2017 | Inflammation | Epigenetics | Stress | All | Inflammation | Epigenetics | Stress | All |
|---|---|---|---|---|---|---|---|---|
| | GSE63060 AD | | | | GSE63061 AD | | | |
| Wilks' $\Lambda$ | 0.8425 | 0.9069 | 0.8976 | 0.6957 | 0.9550 | 0.9575 | 0.9433 | 0.8552 |
| DoF | 7/241 | 6/242 | 9/239 | 22/226 | 7/265 | 6/266 | 9/263 | 22/250 |
| p-value | 1.0E−04 | 5.6E−04 | 1.9E−03 | 1.0E−04 | 9.1E−02 | 7.1E−02 | 7.7E−02 | 9.1E−03 |
| Correct | 66.67% | 62.25% | 64.26% | 74.70% | 57.88% | 58.97% | 60.81% | 68.13% |
| sensitivity | 64.83% | 64.83% | 64.14% | 76.55% | 57.55% | 61.87% | 59.71% | 68.35% |
| specificity | 69.23% | 58.65% | 64.42% | 72.12% | 58.21% | 55.97% | 61.94% | 67.91% |
| AUC | 0.72 | 0.65 | 0.66 | 0.80 | 0.61 | 0.60 | 0.62 | 0.72 |
| | GSE112676 ALS | | | | GSE112680 ALS | | | |
| Wilks' $\Lambda$ | 0.8702 | 0.8547 | 0.7740 | 0.7443 | 0.9259 | 0.8333 | 0.8151 | 0.6736 |
| DoF | 7/733 | 5/735 | 6/734 | 18/722 | 7/293 | 5/295 | 6/294 | 18/282 |
| p-value | 1.0E−04 | 1.0E−04 | 1.0E−04 | 1.0E−04 | 1.9E−03 | 1.0E−04 | 1.0E−04 | 1.0E−04 |
| Correct | 67.61% | 69.23% | 72.87% | 73.95% | 60.8% | 66.78% | 68.44% | 76.74% |
| sensitivity | 55.36% | 57.94% | 60.94% | 63.52% | 58.54% | 65.85% | 66.46% | 73.17% |
| specificity | 73.23% | 74.41% | 78.35% | 78.74% | 63.5% | 67.88% | 70.8% | 81.02% |
| AUC | 0.71 | 0.72 | 0.77 | 0.79 | 0.65 | 0.72 | 0.75 | 0.80 |
| | GSE57475 PD | | | | GSE99039 PD | | | |
| Wilks' $\Lambda$ | 0.9396 | 0.9807 | 0.9269 | 0.8635 | 0.9554 | 0.9794 | 0.9347 | 0.8884 |
| DoF | 7/134 | 6/135 | 9/132 | 22/119 | 7/429 | 6/430 | 9/427 | 22/414 |

TABLE 3-continued

LDA statistics for original Alzheimer's disease discriminating transcripts

| 2017 | Inflammation | Epigenetics | Stress | All | Inflammation | Epigenetics | Stress | All |
|---|---|---|---|---|---|---|---|---|
| p-value | 2.9E-01 | 8.5E-01 | 3.3E-01 | 6.5E-01 | 6.3E-03 | 1.7E-01 | 6.4E-04 | 5.6E-04 |
| Correct | 59.86% | 59.86% | 59.86% | 68.31% | 60.18% | 55.84% | 60.64% | 62.7% |
| sensitivity | 62.37% | 63.44% | 59.14% | 72.04% | 61.46% | 53.17% | 58.05% | 60.49% |
| specificity | 55.1% | 53.06% | 61.22% | 61.22% | 59.05% | 58.19% | 62.93% | 64.66% |
| AUC | 0.60 | 0.55 | 0.61 | 0.67 | 0.61 | 0.58 | 0.64 | 0.67 |
| | | GSE140830 bvFTD | | | | GSE102008 FRDA | | |
| Wilks' Λ | 0.9554 | 0.9716 | 0.9683 | 0.9095 | 0.9772 | 0.9766 | 0.9750 | 0.9284 |
| DoF | 7/353 | 6/354 | 9/351 | 22/338 | 7/497 | 6/498 | 9/495 | 22/482 |
| p-value | 2.3E-02 | 1.1E-01 | 2.5E-01 | 6.2E-02 | 1.2E-01 | 6.5E-02 | 1.8E-01 | 2.6E-02 |
| Correct | 57.62% | 56.51% | 59.28% | 63.16% | 59.21% | 59.21% | 58.42% | 64.95% |
| sensitivity | 63.75% | 60.0% | 57.5% | 60.0% | 60.34% | 59.12% | 57.91% | 63.26% |
| specificity | 55.87% | 55.52% | 59.79% | 64.06% | 54.26% | 59.57% | 60.64% | 72.34% |
| AUC | 0.63 | 0.61 | 0.62 | 0.70 | 0.58 | 0.60 | 0.60 | 0.68 |
| | | GSE99039 HD | | | | GSE140829 AD | | |
| Wilks' Λ | 0.9359 | 0.9559 | 0.8791 | 0.8621 | 0.9574 | 0.9576 | 0.9352 | 0.8803 |
| DoF | 7/251 | 6/252 | 9/249 | 22/236 | 7/445 | 6/446 | 9/443 | 22/430 |
| p-value | 1.9E-02 | 7.5E-02 | 1.6E-04 | 2.7E-02 | 6.8E-03 | 3.5E-03 | 4.5E-04 | 1.0E-04 |
| Correct | 69.5% | 62.93% | 76.83% | 74.52% | 57.17% | 56.29% | 62.03% | 64.46% |
| sensitivity | 59.26% | 66.67% | 70.37% | 66.67% | 56.86% | 55.88% | 65.69% | 63.73% |
| specificity | 70.69% | 62.5% | 77.59% | 75.43% | 57.43% | 56.63% | 59.04% | 65.06% |
| AUC | 0.68 | 0.67 | 0.75 | 0.75 | — | — | — | — |

Figure 2G:
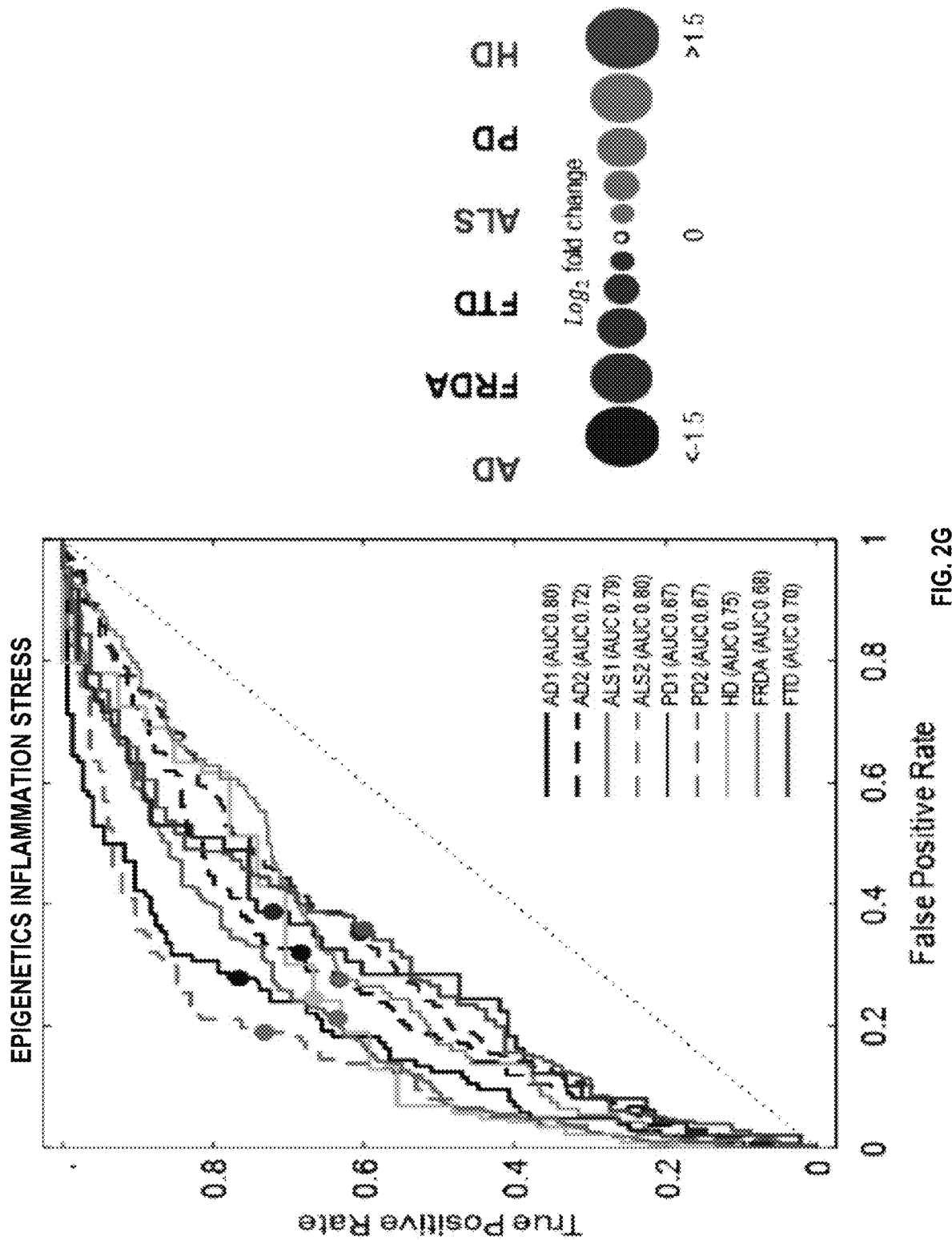

DoF—degrees of freedom;
AUC—area under curve;
Correct—percent samples correctly classified;
AD—Alzheimer's disease;
bvFTD—behavioral variant frontotemporal dementia;
ALS—Amyotrophic lateral sclerosis;
FRDA—Friedreich's ataxia;
PD—Parkinson's disease;
HD—Huntington's disease Performance of the set of transcripts used in our prior work confirmed our previous data by repeating an ability to distinguish Alzheimer's disease from healthy controls in these two larger AD data sets (N=249 and 273) with a probability measure of successful classification or AUC ranging from 0.60 for six epigenetic transcripts to 0.80 for all 22 transcripts representing inflammation, cell stress and epigenetics (FIGS. 2A, 2C, 2E, and 2G). A differential expression analysis between disease and controls was made for the transcripts across all diseases and arranged as a grid of dots with magnitude of change represented by size and direction of change by color (FIG. 2B, FIG. 2D, and FIG. 2F).

3.2 Machine Learning Selection of Transcript Predictors in Blood Classifies AD A machine learning algorithm was implemented to optimize selection of transcripts to be used for disease discrimination. For each node in a binary classification tree, the random forest classifier randomly selects ⅔ of the samples (allowing replacement) in the training set and orders them by expression of each f randomly selected transcript features (without replacement). A ranking measurement called the Gini index selects a transcript with least impurity or entropy at each node to build trees and thus ranks the transcripts by importance. After building many trees in this way the remaining ⅓ of the training samples are used to select the best decision tree. Finally, a confusion matrix is generated after classification of the test sample set. We were able to use one AD blood expression dataset for the supervised training set while another AD dataset was used to validate and measure the predictive power of the transcripts chosen in the learning session. To ensure the best possible scenario for feature selection overlap between the two expression datasets, we matched and kept only feature probes that appear in both AD1 and AD2. About 2000 unidentified gene probes were removed from both datasets resulting in 23,240 matched transcript probes for all 717 samples (329 samples in AD1 and 388 samples in AD2) both containing a mix of AD, MCI, and HC cases (Table 1). Six samples were then excluded from further analysis in AD2 due to ambiguous clinical classification.

Figure 7:
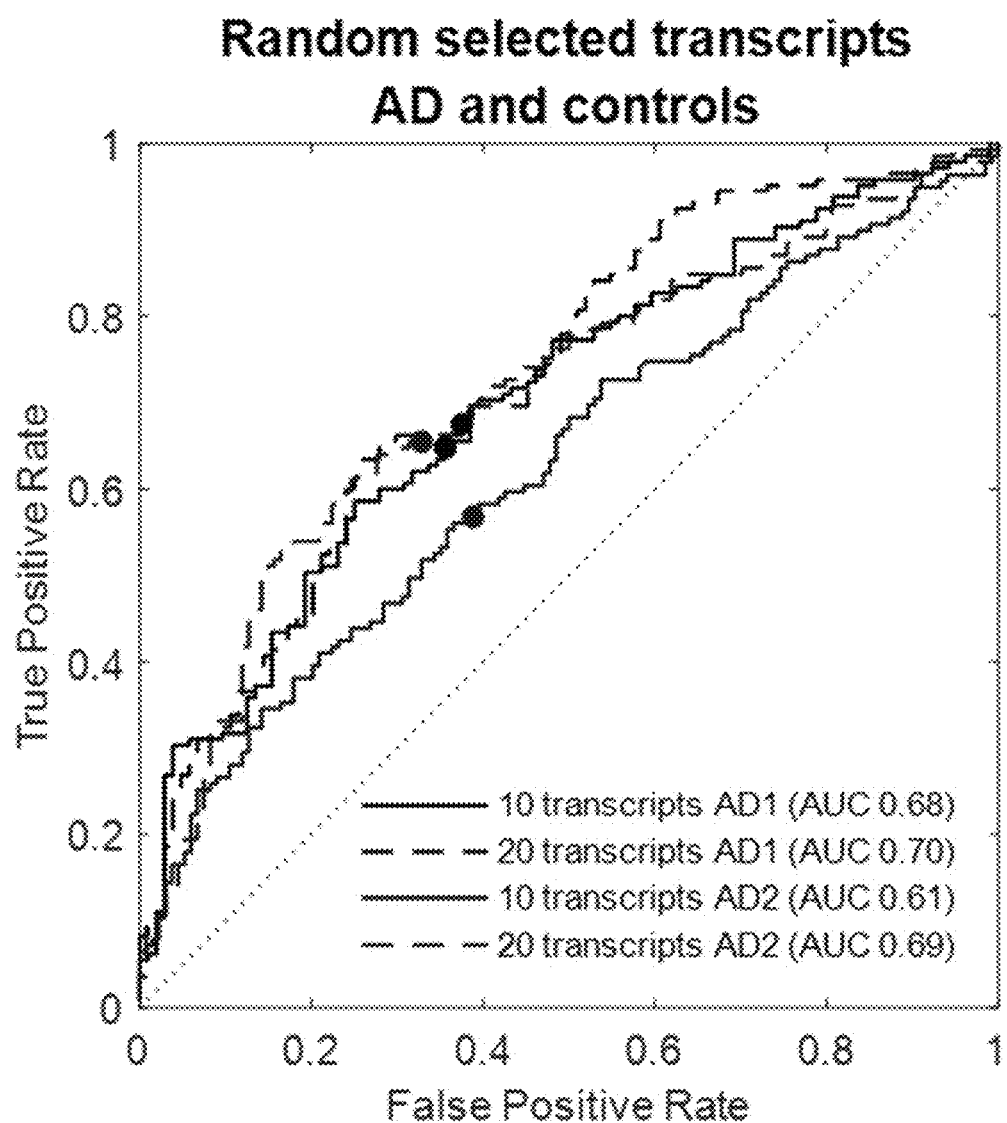
FIG. 7 is a graph illustrating receiver operating curve for randomly selected transcripts showing poor classification of AD. The random selection of a subset of transcript features by random number generator selecting from the entire cohort transcript set results in classification below 70% thus establishing a threshold for AUC probability of disease classification. Furthermore, using all 20 random transcripts over 10 random transcripts does not change the probability of correct disease classification.

We first measured a baseline for prediction probability by selecting twenty transcripts from both AD1 and AD2 using a random number generator and subsequently analyzed with LDA. In order to establish a criterion for AUC significance here, we calculated AUC for these twenty randomly selected transcripts and found that a randomly selected set of transcripts classifies AD from HC with AUC≤0.70 thereby establishing that good classification should be above 70% or AUC>0.70 (FIG. 7, Table 4).

TABLE 4

LDA statistics for randomly selected transcripts to classify Alzheimer's disease from controls.

| | Twenty random transcripts GSE63060 AD1 | Top ten random transcripts GSE63060 AD1 | Twenty random transcripts GSE63061 AD2 | Top ten random transcripts GSE63061 AD2 |
|---|---|---|---|---|
| Wilks' Λ | 0.8525 | 0.8858 | 0.8800 | 0.9490 |
| DoF | 20/228 | 10/238 | 20/252 | 10/262 |
| p-value | 9.4E-03 | 1.1E-03 | 3.1E-02 | 1.8E-01 |
| Correct | 65.46% | 64.66% | 66.3% | 58.97% |

TABLE 4-continued

LDA statistics for randomly selected transcripts to classify Alzheimer's disease from controls.

|  | Twenty random transcripts GSE63060 AD1 | Top ten random transcripts GSE63060 AD1 | Twenty random transcripts GSE63061 AD2 | Top ten random transcripts GSE63061 AD2 |
|---|---|---|---|---|
| sensitivity | 67.59% | 64.83% | 65.47% | 56.83% |
| specificity | 62.5% | 64.42% | 67.16% | 61.19% |
| AUC | 0.70 | 0.68 | 0.69 | 0.61 |

DoF—degrees of freedom;
AUC—area under curve;
Correct—percent samples correctly classified Selecting from the one hundred models generated by RF for the AD data, the top twenty features with the best sensitivity score were then used as predictors for further analysis. Expression data in AD1 was used as the training set and AD2 the test set resulting in a set of transcript disease predictors (FIG. 3B) with AUC of 0.82 while training on data in AD2 and testing on AD1 generated a second set of transcript disease predictors (FIG. 3D) with AUC 87%. Six transcripts (MRPL51, NDUFA1, NDUFS5, two Illumina probes for RPL36AL, and LOC646200 (similar to 60S ribosomal protein L22, Heparin binding protein HBp15, NCBI record removed) were selected in both training sessions of RF analysis on the AD blood datasets. These six transcripts selected consistently for AD classification represent the electron transport chain and ribosomal complexes.

Figure 3A:
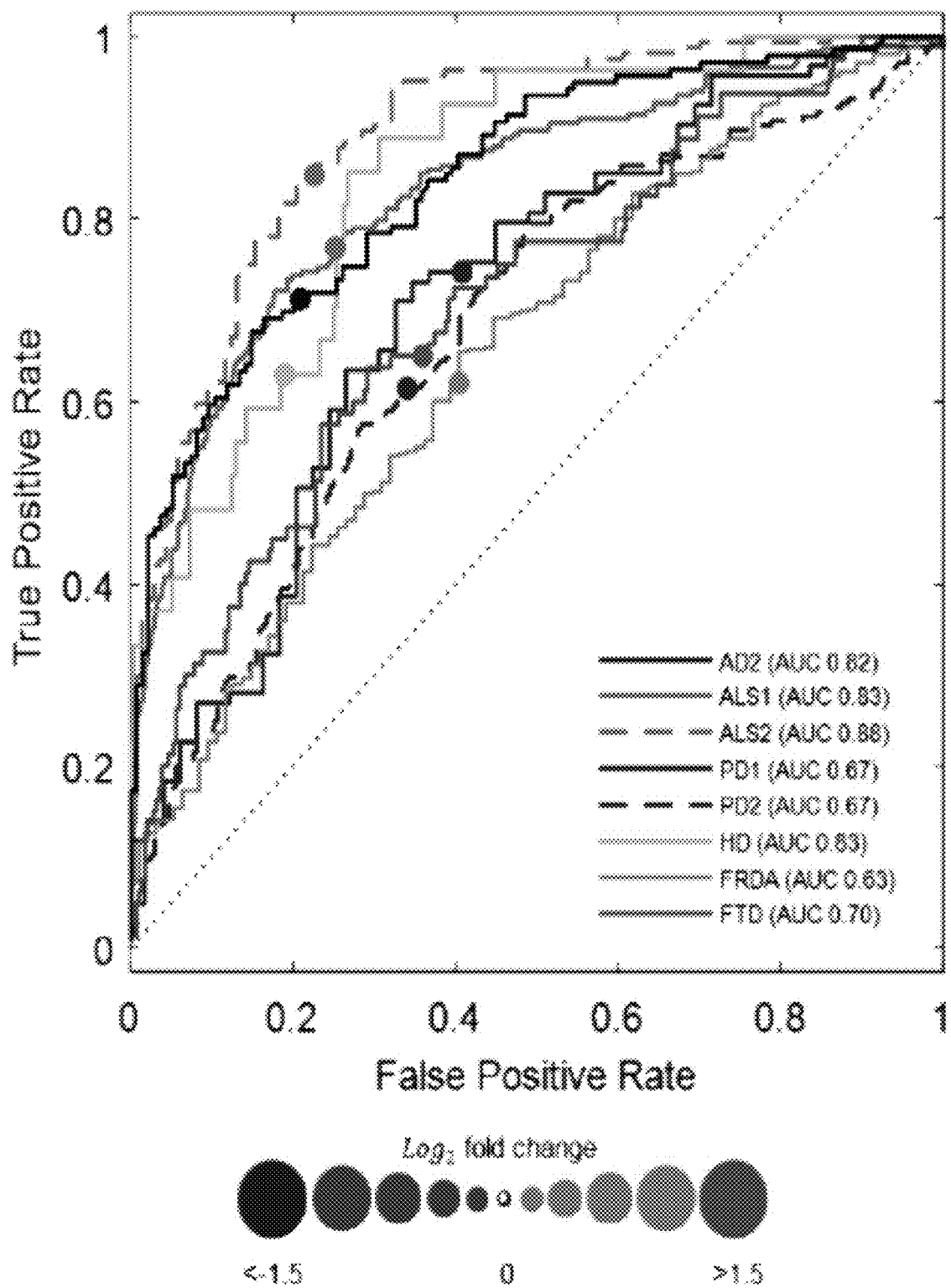
Figure 3C:
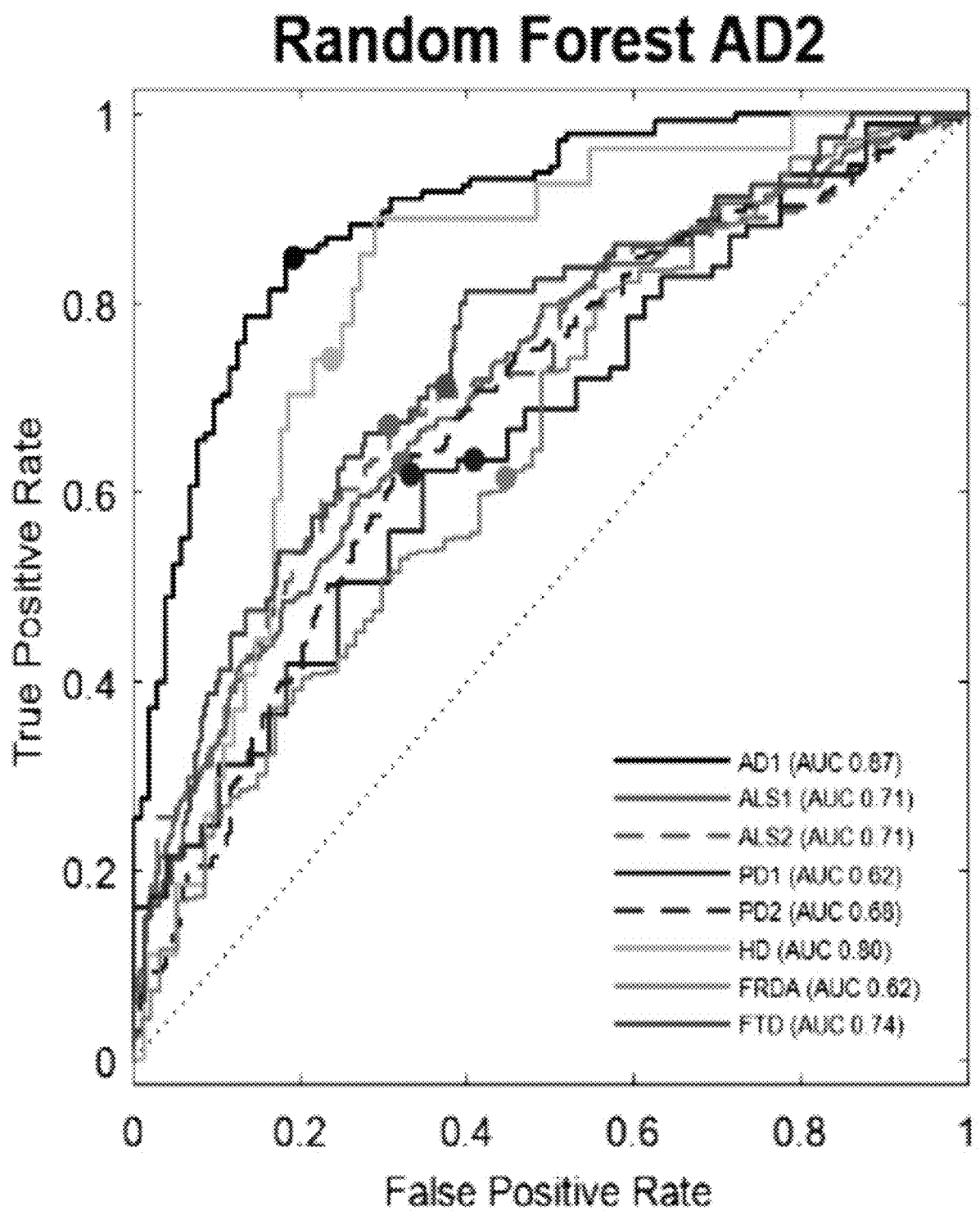

3.3 Ability of Transcripts Selected by Machine Learning to Distinguish AD to then Distinguish Other Neurodegenerative Diseases We next determined the ability of the panel of RNA transcripts selected by RF which distinguish Alzheimer's disease to distinguish the other neurodegenerative diseases sampled. The ROC plots for AD classifying transcripts tested on other diseases (FIG. 3A and FIG. 3C), illustrate that the selected transcripts are better at distinguishing some diseases over others. In addition to AD, most notable is Huntington disease which yielded a probability of successful classification with AUC 0.80 and 0.83 (FIG. 3A and FIG. 3C) when assayed by the panels selected for each of the two Alzheimer cohorts. Also notable, but less consistent, was for ALS whose two cohorts yielded AUC of 0.83/0.88 and 0.71/0.71 (FIG. 3A and FIG. 3C). The filled circles in FIG. 3B and FIG. 3D, indicate that some of the same genes, such as, MRPL51, SHFM1, ATP5I, ING3, AATF, APBB3, CDK10, and UQCRH representing metabolomic, apoptosis, and ubiquitylation processes, are affected in both Alzheimer's and ALS, though not always in the same direction.

The group of features selected when training on AD1 and subsequently validated in AD2 successfully classified AD, ALS and HD from controls with an 'excellent' (AUC>80%) rated accuracy making discriminatory AUC for AD1 test set (AUC 82%), ALS1 (AUC 83%), ALS2 (AUC 87%), and HD (AUC 83%). The classification made in a third AD blood data set was found to be border line (AD3, AUC 71% data not shown) while the classification within PD, FRDA, and FTD from controls was poor having probabilities PD1 (AUC 67%), PD2 (AUC 67%), FRDA (AUC 63%), and FTD (AUC 70%). The group of similar features selected when training on AD2 and subsequently validated in AD1 again classified AD and HD with excellent discriminating probability AD1 (AUC 87%), HD (AUC 80%), but in the case of ALS, this RF transcript set picks (ALS1 and ALS2, AUC 71%) did not repeat the excellent performance as the former transcripts selected by training on AD1. This may be due to the different set of transcripts selected from AD2 and their ability to discriminate ALS from controls and/or the reduced number of this second set of AD classifying transcripts (FIG. 3D) present within the two ALS sets. Sixteen of the former set of transcripts are present in the ALS blood datasets but only nine of the second set of twenty transcripts are present in the ALS blood datasets. Interestingly, in the case of HD, only eleven of this second set of AD transcripts were present but these eleven were able to discriminate HD from controls with excellent performance (FIG. 3O). These twenty features were also able to classify FTD from controls with borderline performance (AUC 74%) while classification within PD and FRDA was less than acceptable PD1 (AUC 62%), PD2 (AUC 68%), and FRDA (AUC 62%) (FIG. 3C). Classification performance testing on the third AD blood expression dataset was borderline (AD3, AUC 72%, data not shown).

Inspection of the significance and separation between classes (disease and control) measured using Wilks' Λ was in good agreement with the AUC data. Again, a Λ less than 0.8 represented good class separation combined with F-ratio $p < 0.05$ and resulted in at least 75% of the case samples classified correctly. The LDA statistics for AD transcript predictors selected by RF are documented in Table 5.

TABLE 5

LDA statistics for Random Forest selected transcripts AD GSE63060 and GSE63061

| Random Forest | Training on GSE63060 | Training on GSE63061 | Training on GSE63060 | Training on GSE63061 |
|---|---|---|---|---|
|  | GSE63060 AD | | GSE63061 AD | |
| Wilks' Λ |  | 0.5509 | 0.6732 |  |
| DoF |  | 20/228 | 20/252 |  |
| p-value |  | 1.0E−04 | 1.0E−04 |  |
| Correct |  | 83.13% | 75.09% |  |
| sensitivity |  | 84.83% | 71.22% |  |
| specificity |  | 80.77% | 79.1% |  |
| AUC |  | 0.87 | 0.82 |  |
|  | GSE112676 ALS | | GSE112680 ALS | |
| Wilks' Λ | 0.7218 | 0.8680 | 0.5715 | 0.8667 |
| DoF | 16/724 | 9/731 | 16/284 | 9/291 |

TABLE 5-continued

LDA statistics for Random Forest selected transcripts
AD GSE63060 and GSE63061

| Random Forest | Training on GSE63060 | Training on GSE63061 | Training on GSE63060 | Training on GSE63061 |
|---|---|---|---|---|
| p-value | 1.0E−04 | 1.0E−04 | 1.0E−04 | 1.0E−04 |
| Correct | 75.44% | 66.4% | 81.4% | 68.11% |
| sensitivity | 76.82% | 63.09% | 84.76% | 67.07% |
| specificity | 74.8% | 67.91% | 77.37% | 69.34 |
| AUC | 0.83 | 0.71 | 0.88 | 0.71 |
| | GSE57475 PD | | GSE99039 PD | |
| Wilks' Λ | 0.8751 | 0.9111 | 0.9140 | 0.9070 |
| DoF | 20/121 | 15/126 | 18/418 | 12/424 |
| p-value | 6.3E−01 | 6.5E−01 | 3.6E−03 | 1.0E−04 |
| Correct | 69.01% | 61.97% | 63.84% | 64.53% |
| sensitivity | 74.19% | 63.44% | 61.46% | 61.95% |
| specificity | 59.18% | 59.18% | 65.95% | 66.81% |
| AUC | 0.67 | 0.62 | 0.67 | 0.68 |
| | GSE140830 bvFTD | | GSE102008 FRDA | |
| Wilks' Λ | 0.9041 | 0.8836 | 0.9518 | 0.9465 |
| DoF | 20/340 | 20/340 | 19/485 | 17/487 |
| p-value | 1.9E−02 | 1.9E−03 | 1.8E−01 | 5.5E−02 |
| Correct | 64.27% | 64.54% | 61.58% | 60.4% |
| sensitivity | 65.0% | 71.25% | 62.04% | 61.56% |
| specificity | 64.04% | 62.63% | 59.57% | 55.32% |
| AUC | 0.70 | 0.74 | 0.63 | 0.62 |
| | GSE99039 HD | | GSE140829 AD | |
| Wilks' Λ | 0.806 | 0.9072 | 0.8522 | 0.8484 |
| DoF | 18/240 | 11/247 | 20/432 | 20/432 |
| p-value | 1.0E−04 | 1.1E−02 | 1.0E−04 | 1.0E−04 |
| Correct | 79.15% | 76.06% | 66.45% | 68.6%5 |
| sensitivity | 62.96% | 74.07% | 69.61% | 71.08% |
| specificity | 81.03% | 76.29% | 63.86% | 66.67% |
| AUC | 0.83 | 0.80 | 0.71 | 0.72 |

Figure 3D:
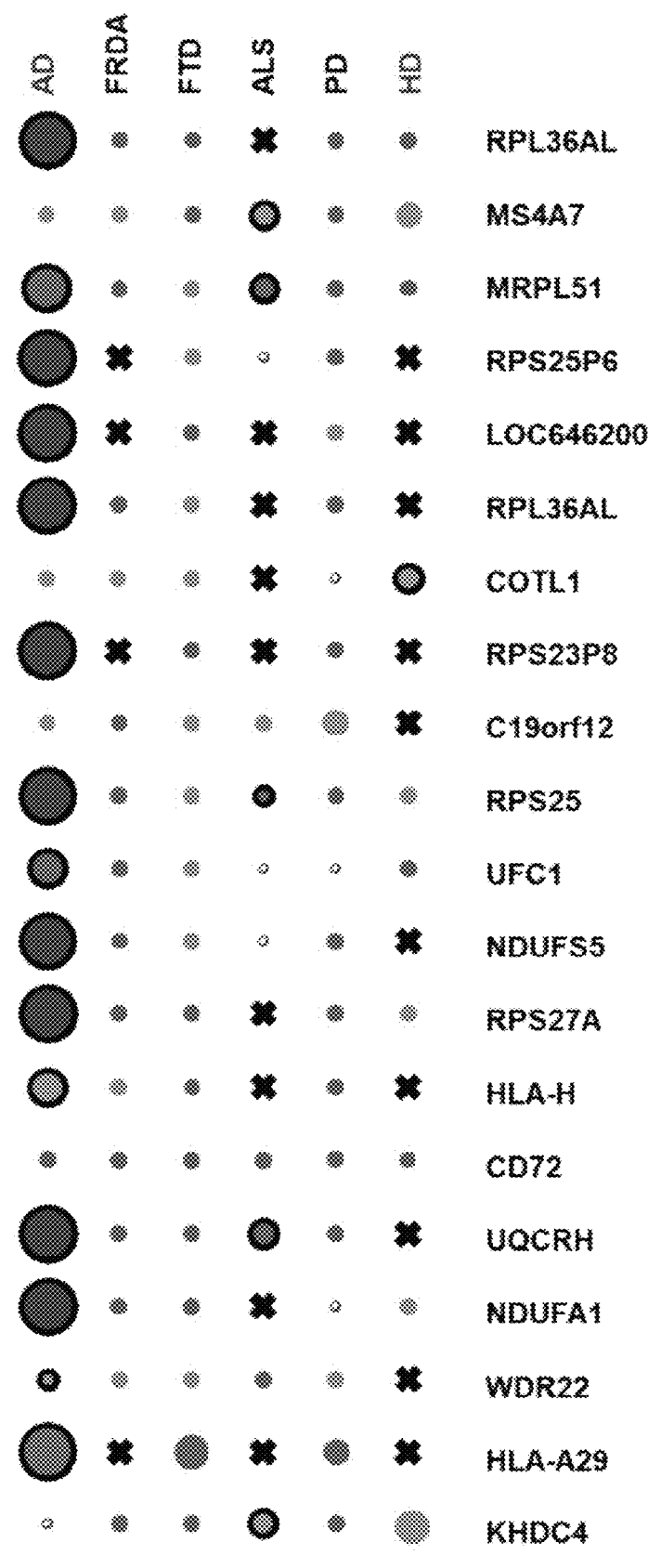

DoF—degrees of freedom;
AUC—area under curve;
Correct—percent samples correctly classified;
AD—Alzheimer's disease;
bvFTD—behavioral variant frontotemporal dementia;
ALS—Amyotrophic lateral sclerosis;
FRDA—Friedreich's ataxia;
PD—Parkinson's disease;
HD—Huntington's disease A differential expression analysis was made between disease and controls for each neurodegenerative disease using these two sets of RF selected transcripts. The $\log_2$ differential expression values are presented in a grid format represented by dots where size indicates magnitude and directional expression change by the color (FIG. 3B and FIG. 3D). While the AD and ALS expression data contained some differences in disease for these AD transcript disease predictors, the HD and FTD dataset which can also be classified using these twenty transcripts did not have large change magnitudes suggesting that significant differential expression values are important for distinguishing diseases but not necessary when selected by a RF algorithm and subsequently analyzed using LDA.

Figure 8A:
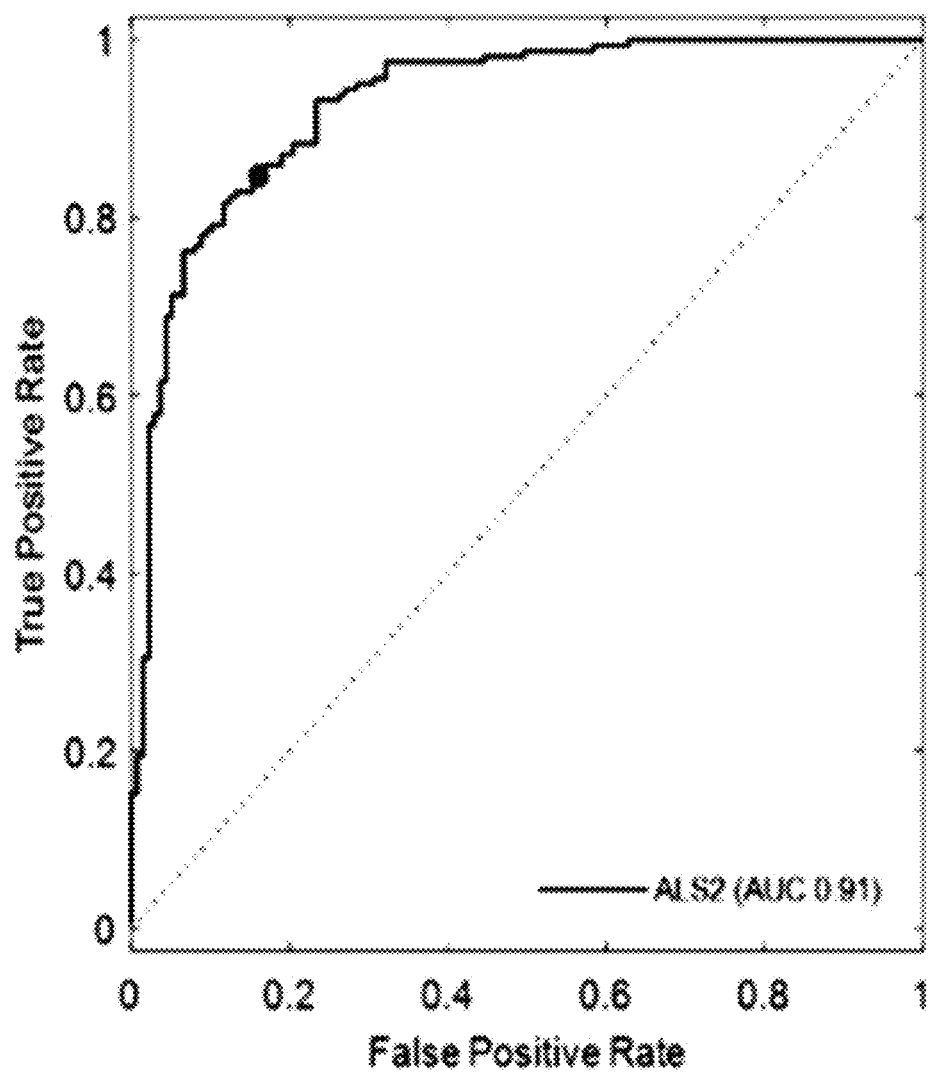
Figure 8A:
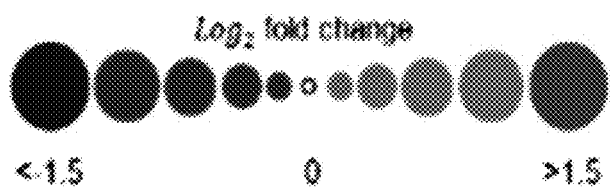
Figure 8B:
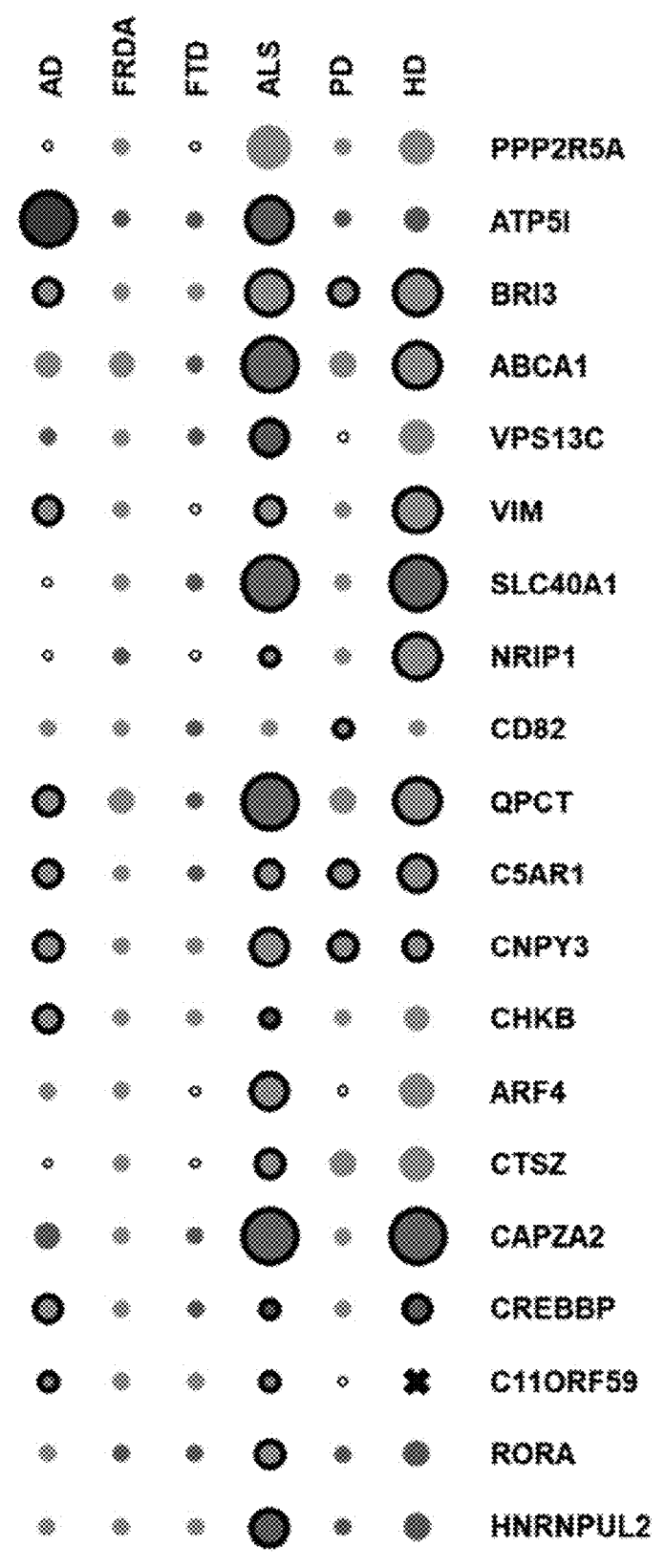
Figure 8C:
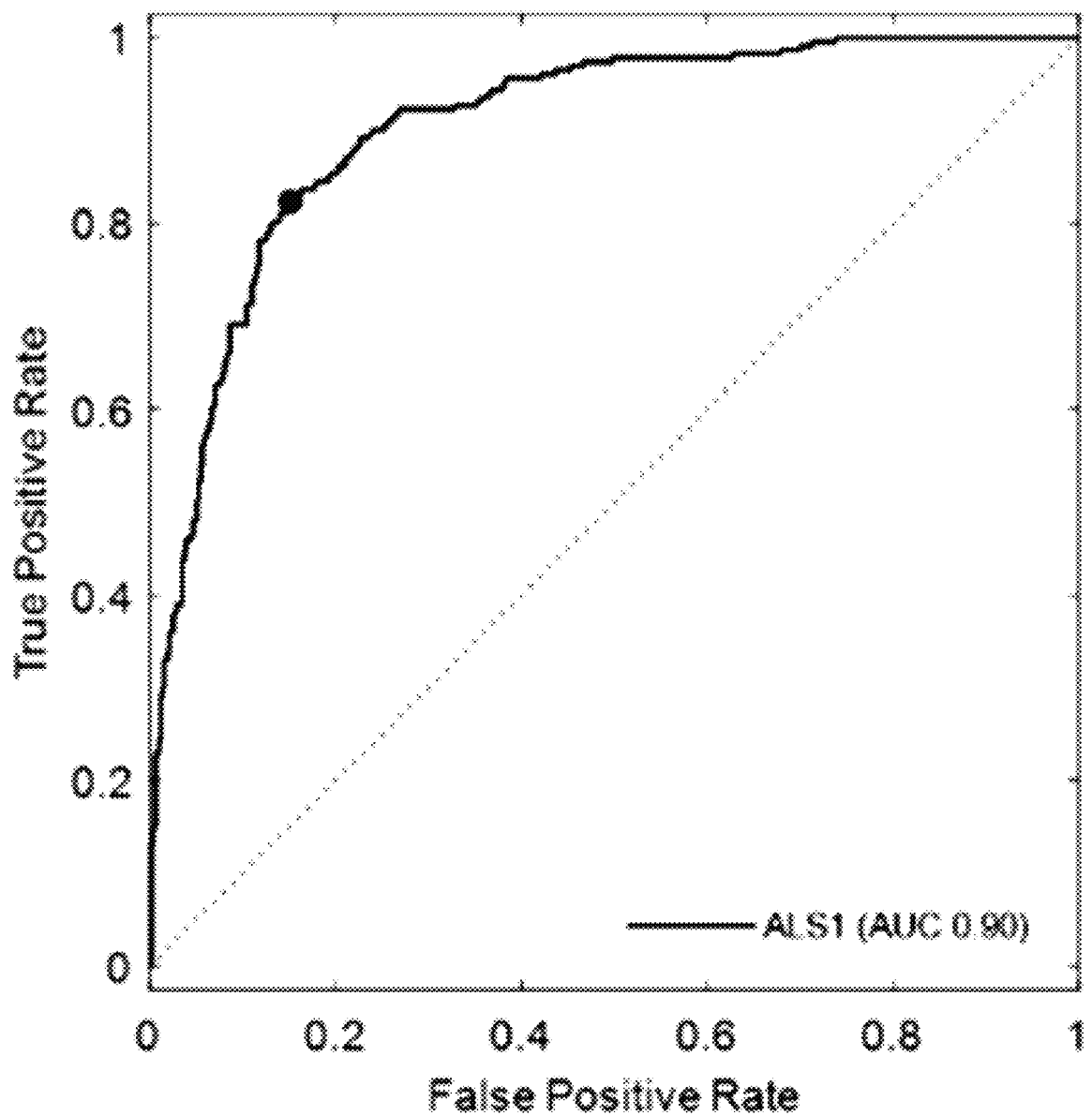

3.4 Machine Learning Selection of Blood Transcripts to Distinguish Neurodegenerative Diseases Other than AD We further sought to select unique sets of RF classifiers for each of the other neurodegenerative diseases. We acquired two datasets each of ALS and PD, however, the PD datasets were collected and generated on different manufacturer platforms by different research groups and we found it difficult to match transcripts due to inconsistencies in lengths and binding sites of oligomer probes between the two cohorts and subsequently chose to treat the two PD sets individually. The RF classifier method was applied to the blood RNA expression datasets to distinguish between disease and healthy controls. In the case of ALS, the expression datasets were first matched and sorted against each other to ensure each contained the same set of features. Training on ALS1 and test data ALS2 resulted in a set of twenty transcripts with sensitivity 74% while training on ALS2 and testing ALS1 generated a set of twenty transcripts with disease prediction performance in the test set of 91% sensitivity (FIG. 8).

Figure 11A:
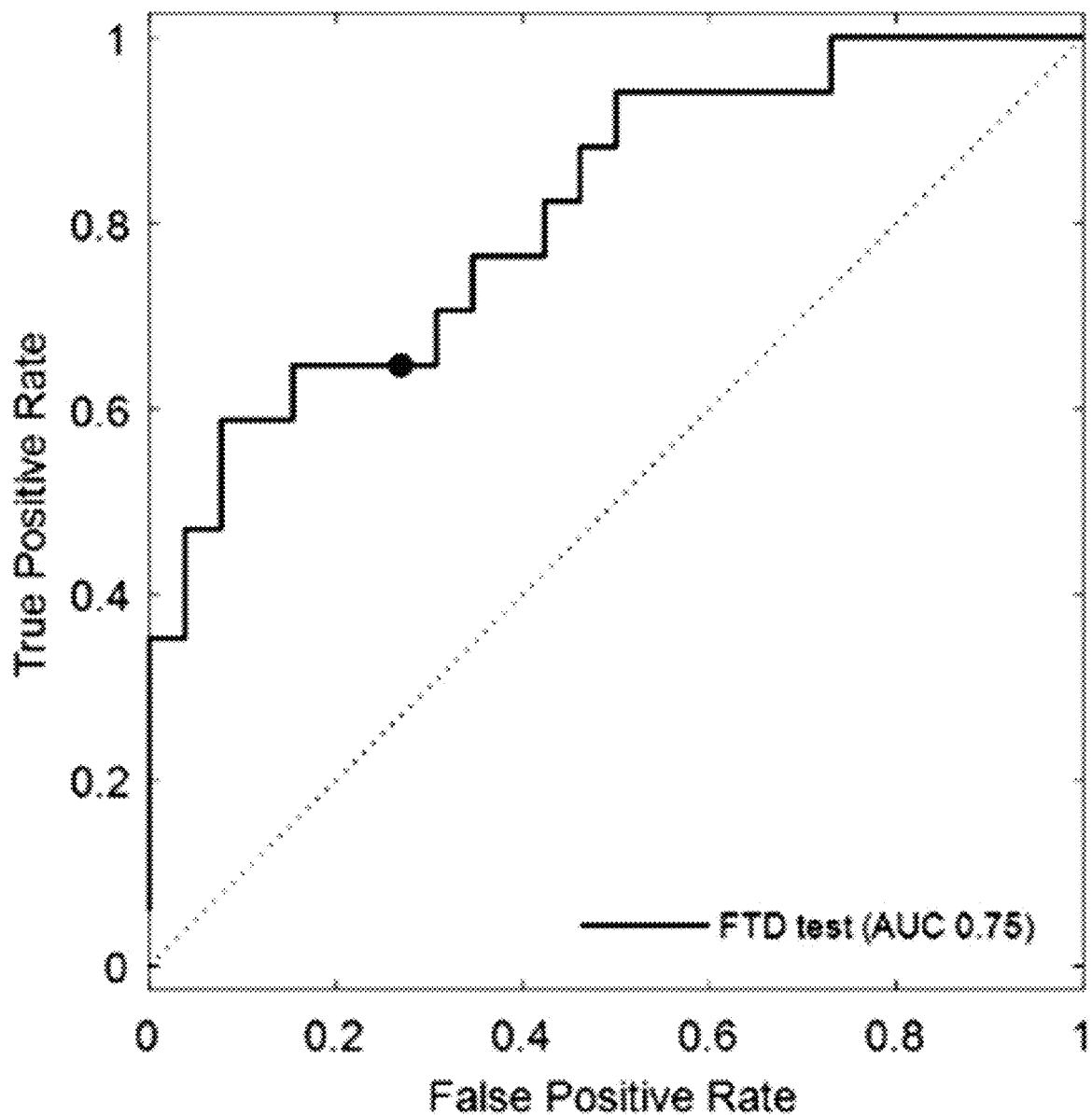
Figure 11A:
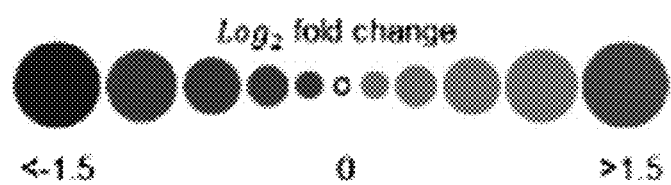
Figure 12:
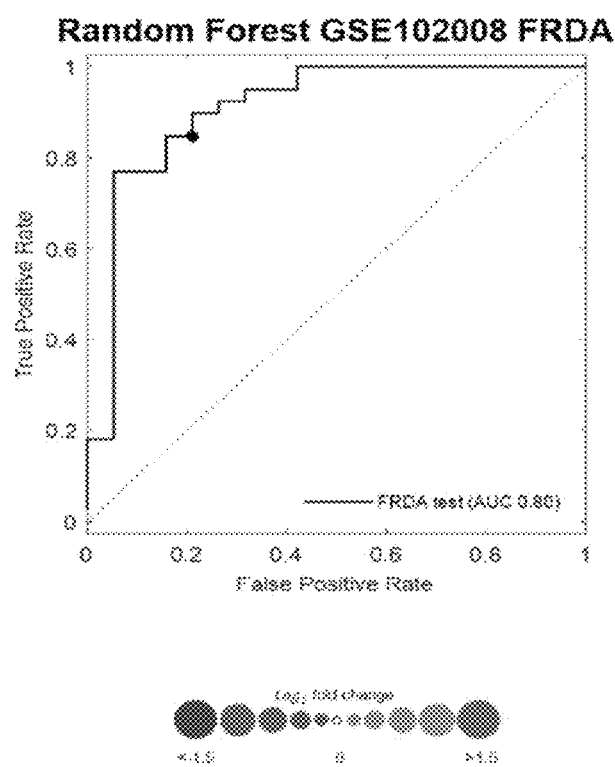
FIGS. 12A-12B are graphs and analysis showing random forest selected transcripts distinguish Friedreich's ataxia from healthy controls. A) Top twenty random forest transcript picks to select FRDA from controls. Trained and tested within GSE102008. Model #79 was selected with sensitivity 79%. Receiver operator curves of discriminant scores generated from Linear discriminant analysis. LDA midpoint cutoff indicated on curves by solid dot. B) Differential expression analysis on the FRDA top twenty transcripts for disease samples and associated healthy controls for each disease using R limma package. Size of dot depicts magnitude of differential expression value with orange increased expression in disease and blue decreased. Expression greater or less than 1.5 fold-change marked by largest darker dots. Dots with black outline show significant p<0.01 false discovery rate corrected.

The PD data cohorts were treated individually by first separating out 20% test samples and the resultant RF selected twenty predictive transcripts from each. PD1 picks resulted in 94% sensitivity and PD2 the top set of predictors only performed with sensitivity 60% (FIG. 9, Supplemental Worksheet). There is only one cohort each of HD, FTD, and FRDA expression data and each where divided into training and test sets. For HD, which is a cohort within PD2 dataset (GSE99039), the twenty classifying transcripts selected on the training data set and validated in the test set measured an excellent performance of the best model at 83% sensitivity (FIG. 10, Supplemental worksheet). The RF selection on FTD and FRDA generated twenty transcript classifiers with 71% sensitivity and 79% sensitivity respectively (supplemental FIGS. 11-12, Supplemental worksheet of selected transcripts).

Figure 8D:
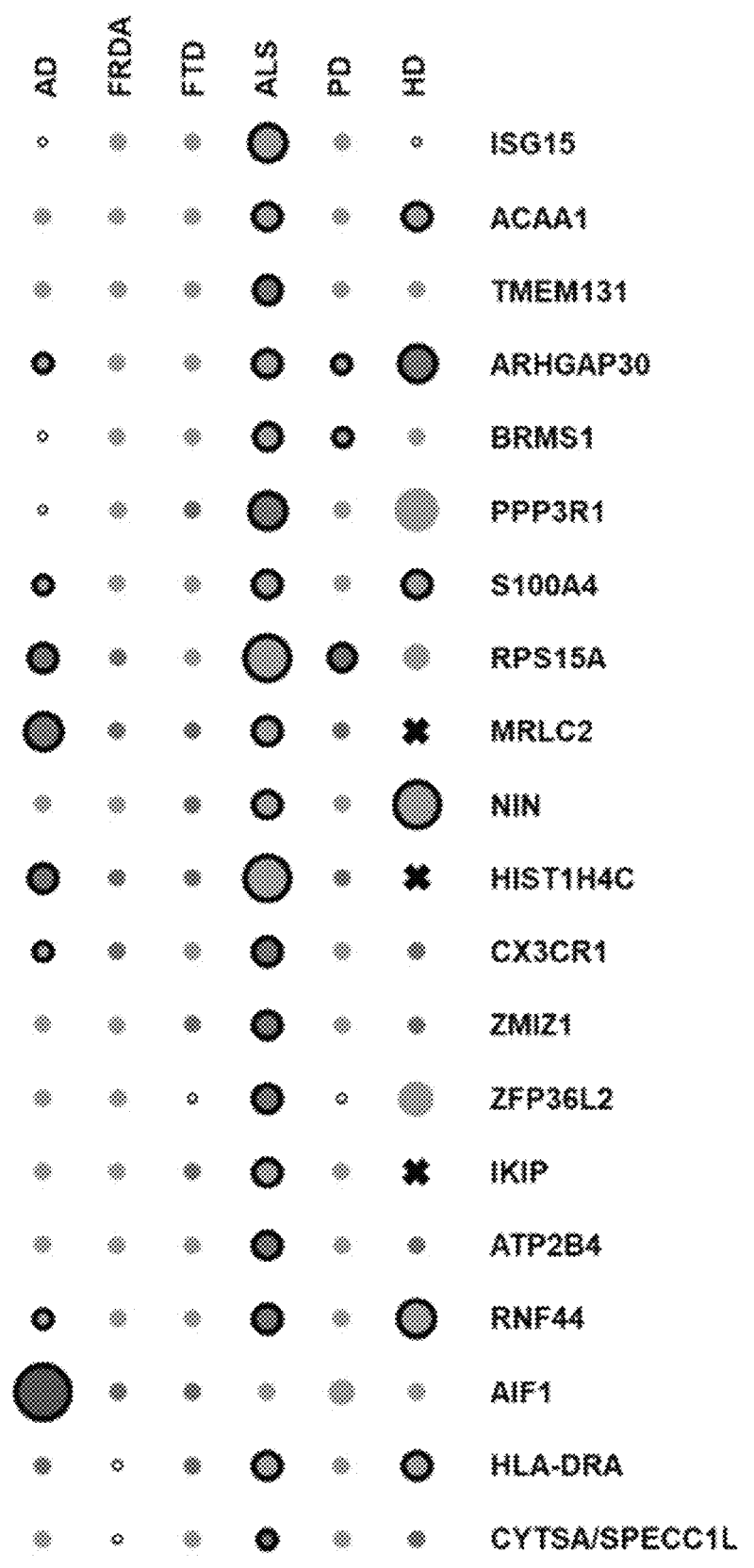

For each disease cohort dataset, the respective group of twenty transcripts selected by RF to discriminate between disease and controls were further analyzed using our LDA method using the test sets removed for the validation step of RF. The results for AD groups are plotted together in FIG. 3 with excellent discrimination for both RF transcript sets AD1 picks (AUC 82%) and AD2 picks (AUC 87%). The group of features selected for each of the ALS cohorts classified disease and control samples with excellent accuracy (AUC 91%/AUC 90%). The distinguishing transcripts with significant differential expression for ALS were ABCA1, SLC40A1, QPCT, and CAPZA2 representing apoptosis and inflammation processes (FIG. 8B and FIG. 8D, Supplemental Worksheet).

Figure 9A:
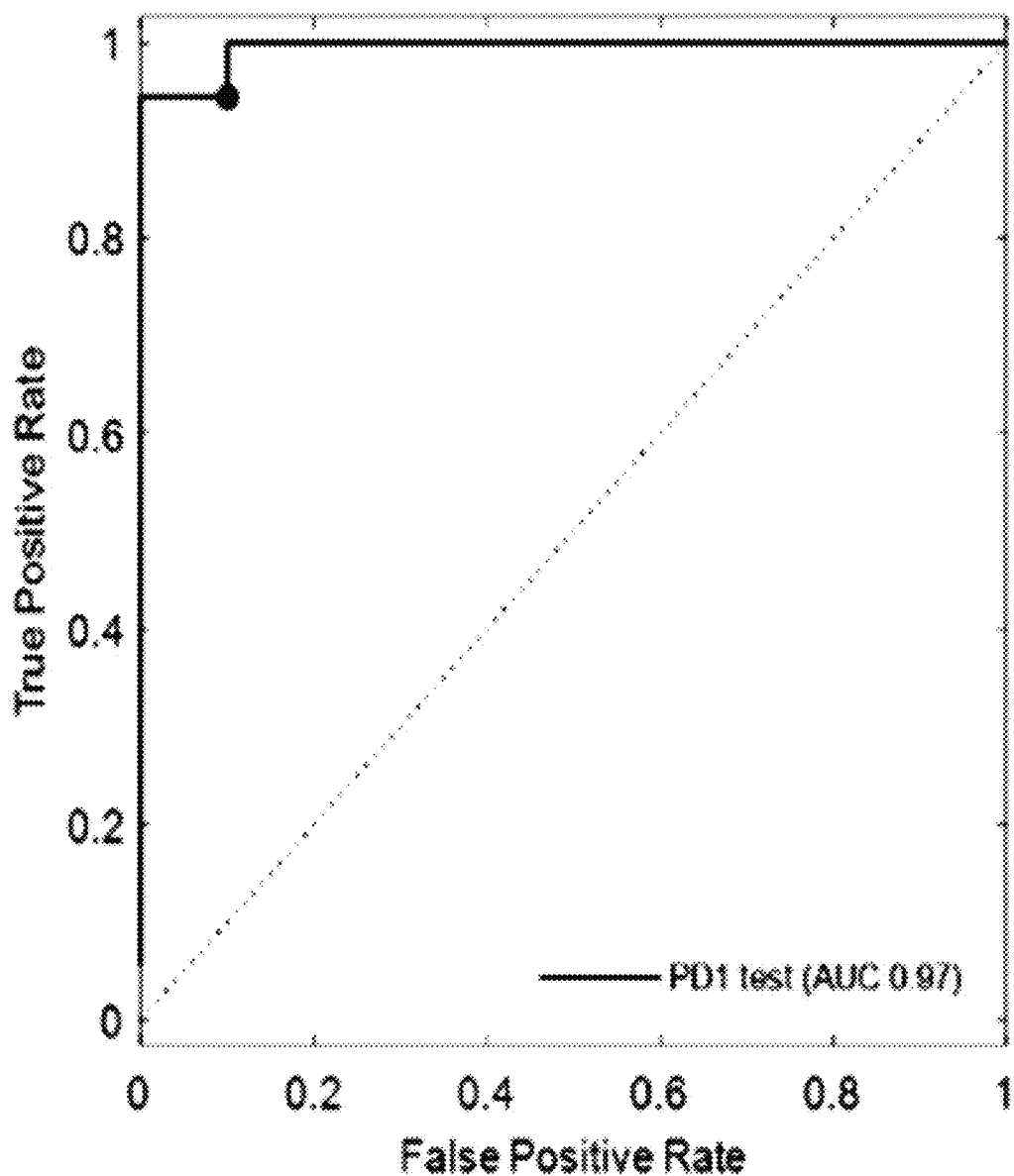
Figure 9A:
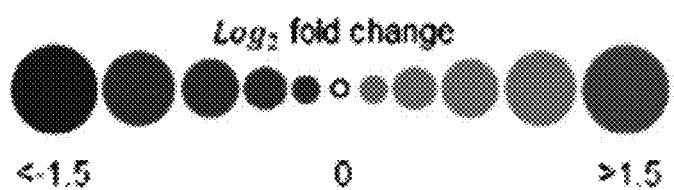
Figure 9C:
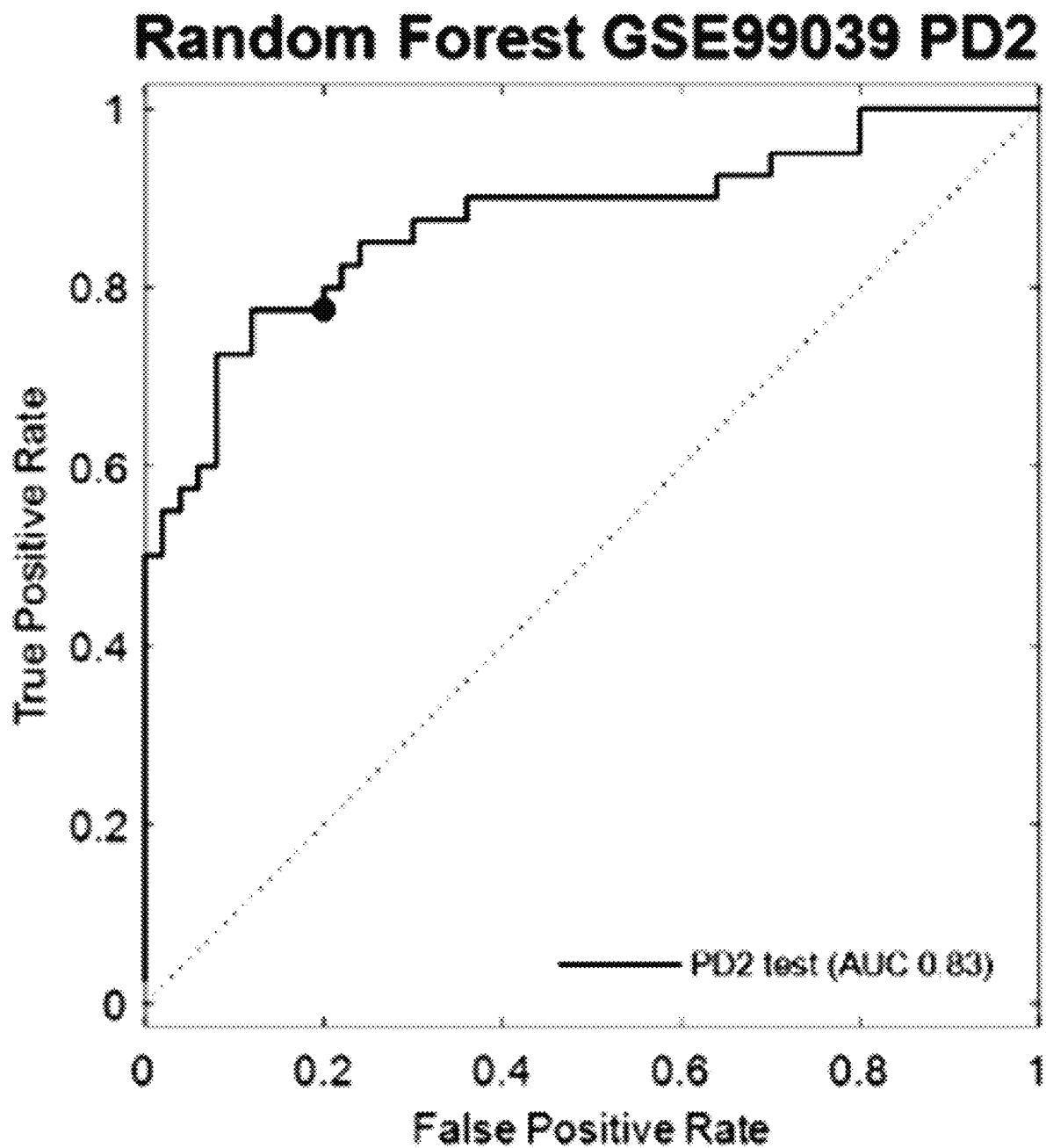
Figure 9D:
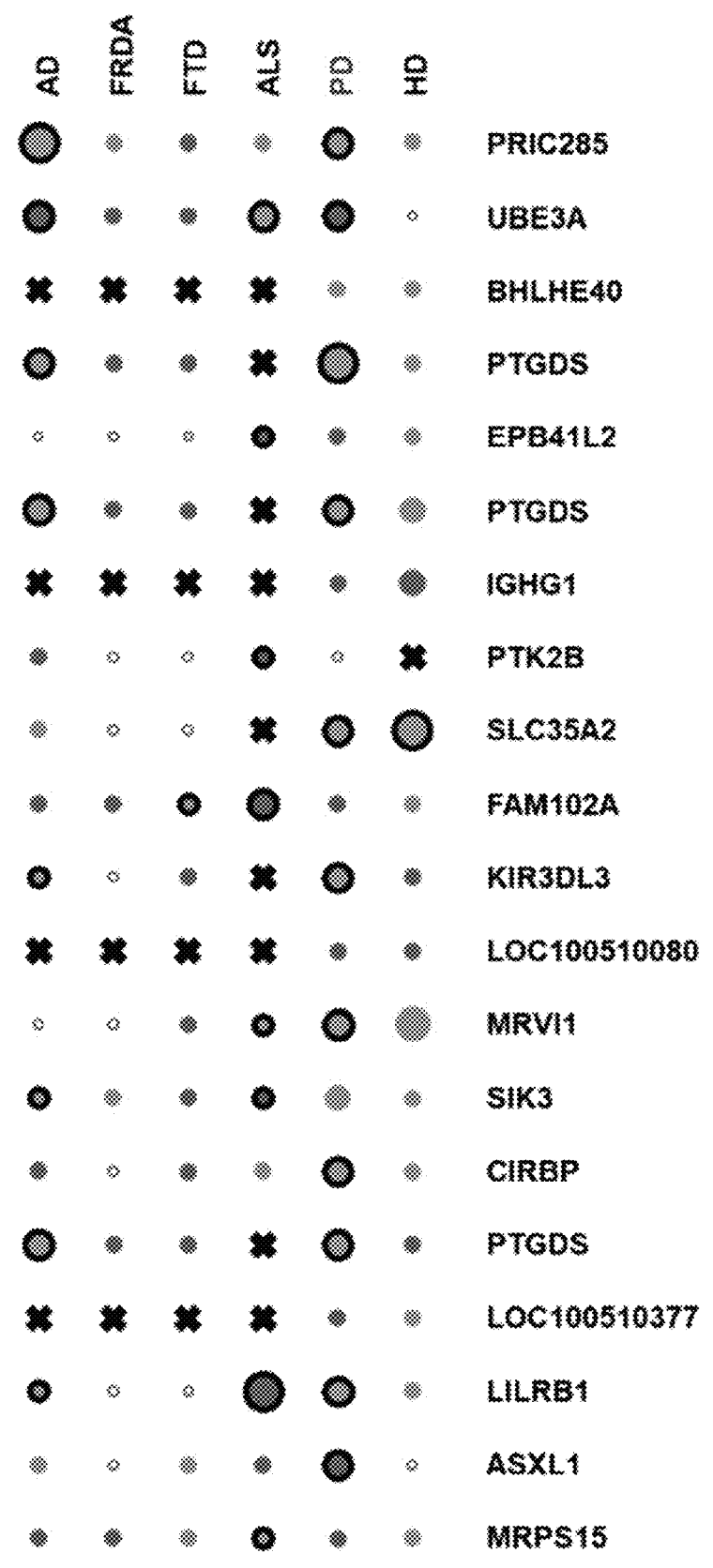
Figure 10A:
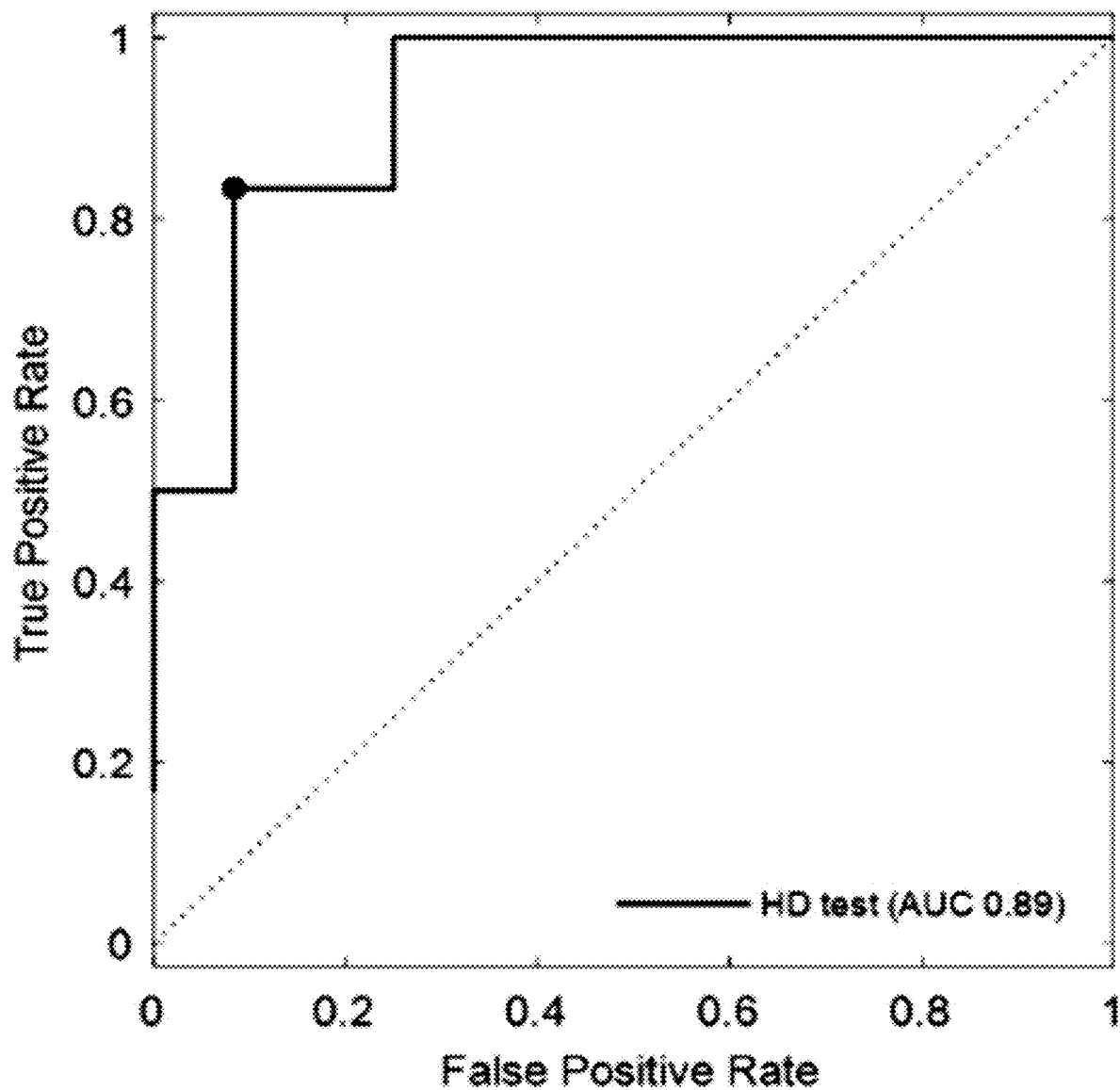
Figure 10A:
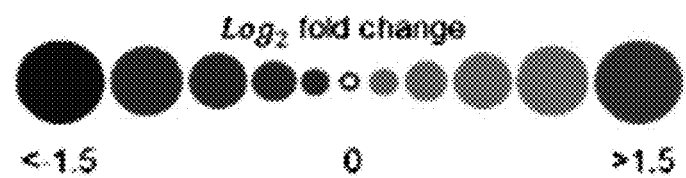
Figure 10B:
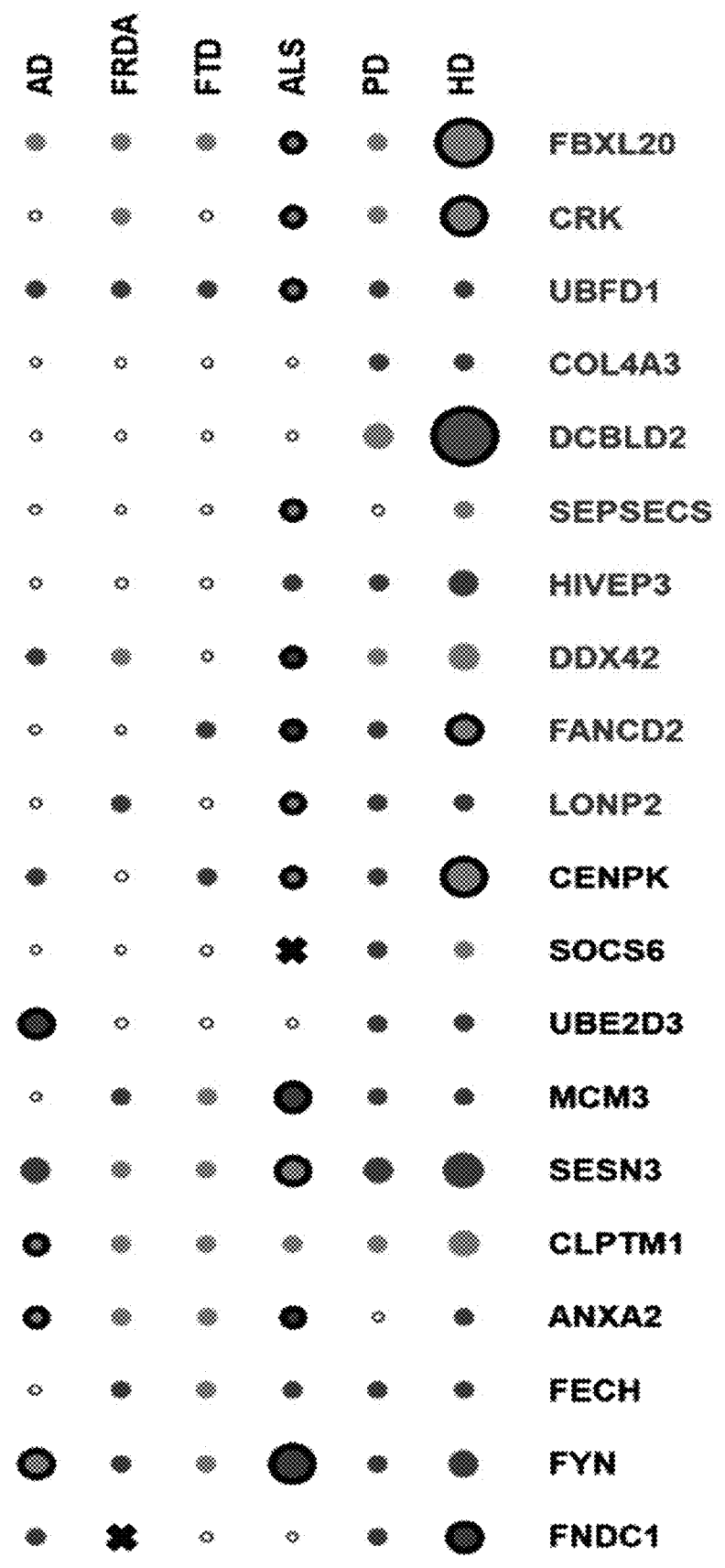

Similarly, features selected on the two training sets with PD cohort datasets and validated using the isolated test sets generated exceptionally accurate classification with AUC 97%/AUC 83% (FIGS. 9A and 9C). A population of transcripts distinguishing PD from healthy controls involved in apoptosis and inflammation processes with significant pvalues were PTGDS, SLC35A2, KIR3DL3, CIRBP, DAPK2, and LILRB1 (FIGS. 9B and 9D, supplemental worksheet). In the case of HD, training generated twenty transcripts, however, for LDA the number of samples in the test set must be less than the size of the disease cohort, so only ten of the twenty transcripts picks could be used for LDA. The RF algorithm classifies each transcript contribution importance to accurate classification. A selection of the top ten ranked features were used in the LDA analysis on the test set and regardless of the reduced number of transcripts, had excellent classification (AUC 89%). Of the ten transcripts, four with involvement in inflammation, apoptosis, and ubiquitylation showed significant differential expression FBXL20, CRK, FANCD2, and DCBLD2 (FIG. 10, supplemental worksheet). The results for FTD and FRDA analysis can be found in FIGS. 11-12 and the Supplemental Worksheet of transcript annotations. Inspection of the separation statistics for the RF generated transcripts on other neurodegenerative diseases (Table 6) suggests that although the discriminant analysis of PD (Wilks' $\Lambda$=0.13), HD (Wilks' $\Lambda$=0.49), FTD (Wilks' $\Lambda$=0.70), and FRDA (Wilks' $\Lambda$=0.55) implied good classification separation by LDA for small Wilks' $\Lambda$, the F-ratio p>0.05 for each indicates LDA separation may be due to chance only. Additional testing of the selected transcripts will be required for validation.

TABLE 6

LDA statistics for Random forest selected transcripts within each of the other neurodegenerative diseases.

| Random forest | Train on GSE112676 ALS | Train on GSE112680 ALS | Training set 80% and set 20% Test | | | | |
|---|---|---|---|---|---|---|---|
| | | | GSE57475 PD | GSE99039 PD | GSE99039 HD | GSE140830 bvFTD | GSE102008 FRDA |
| Wilks' $\Lambda$ | 0.5011 | 0.5757 | 0.1297 | 0.5983 | 0.4884 | 0.6958 | 0.5483 |
| DoF | 20/280 | 20/720 | 20/7 | 20/69 | 10/7 | 20/22 | 20/37 |
| p-value | 1.0E−04 | 1.0E−04 | 1.3E−01 | 5.4E−03 | 6.8E−01 | 9.5E−01 | 1.3E−01 |
| Correct | 84.39% | 84.08% | 100% | 78.89% | 88.89% | 69.77% | 82.76% |
| sensitivity | 84.76% | 82.4% | 100% | 77.5% | 83.33% | 64.71% | 84.62% |
| specificity | 83.94% | 84.84% | 100% | 80.0% | 91.67% | 73.08% | 78.95% |
| AUC | 0.91 | 0.90 | 0.97 | 0.83 | 0.89 | 0.75 | 0.80 |

DoF—degrees of freedom;
AUC—area under curve;
Correct—percent samples correctly classified;
bvFTD—behavioral variant frontotemporal dementia;
ALS—Amyotrophic lateral sclerosis;
FRDA—Friedreich's ataxia;
PD—Parkinson's disease;
HD—Huntington's disease

3.5 Expression Analysis and Canonical Pathway Analysis

Figure 4A:
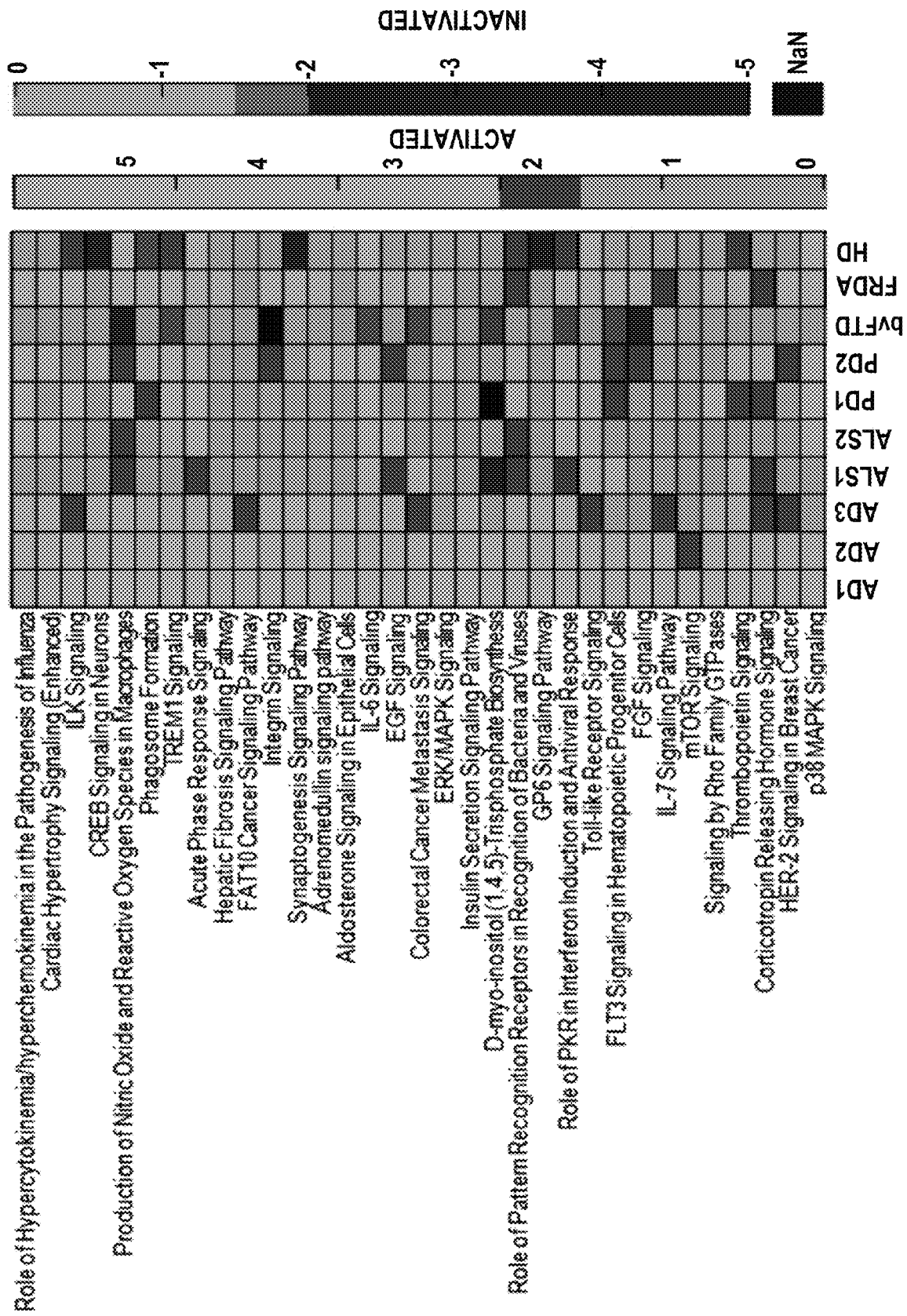
FIG. 4 is an illustration of a canonical pathway comparison. Differential expression values for all transcripts were calculated within each disease dataset using R limma. $Log_2$ fold change of expression in disease and FDR corrected p-values were then uploaded to IPA for core analysis. A comparison analysis was subsequently made across all six diseases. IPA calculates a z-score statistic for comparison of expression enrichment against IPA reference gene list. Cutoff was set at B-H corrected p=0.01. A z-score less than −2 is considered an inhibited pathway (blue) while a z-score greater than 2 is activated (orange). List was trimmed to include only pathways with consistent significance in AD cohorts.
Figure 4B:
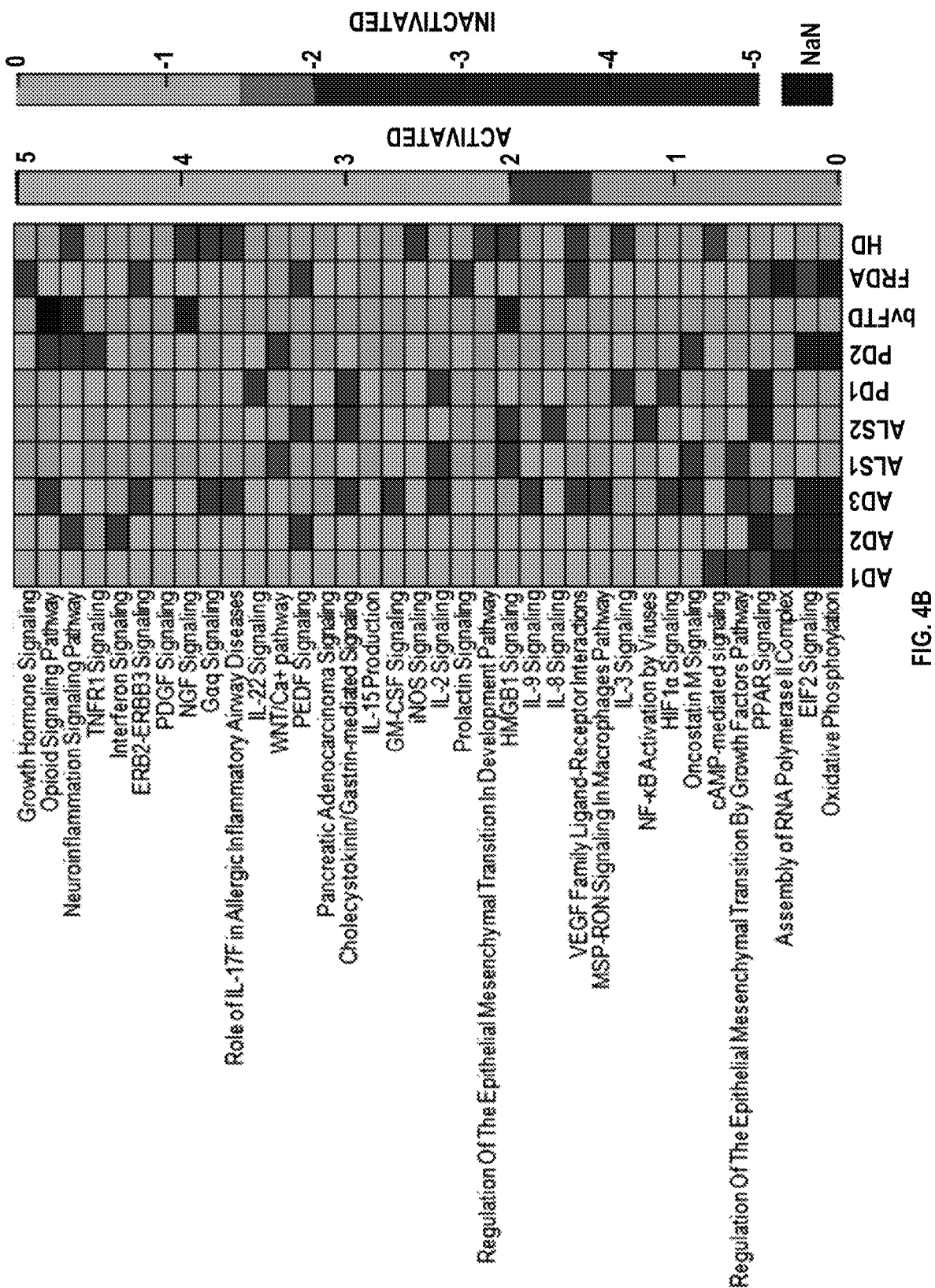

We next conducted Ingenuity Pathway Analysis (IPA) core analysis for each disease cohort utilizing differential expression values for all RNA species available in the datasets and generated a heat map comparing activation or inactivation in canonical pathways across the six diseases (FIG. 4). Within the core IPA analysis, z-scores are calculated for each enriched pathway to predict whether the pathway is activated (orange) or inhibited (blue). A comparison analysis places these predictions side-by-side in heatmap format to help visualize differences and similarities across diseases. Displayed are only those canonical pathways which were significant in the AD datasets next to the corresponding information comparing the other neurodegenerative diseases (FIG. 4). There are multiple activated pathways in AD but only four inactivated pathways including PPAR signaling, EIF2 signaling, assembly of RNA Polymerase II Complex, and oxidative phosphorylation. Peroxisome proliferator-activating receptors (PPAR) do not actually induce peroxisome proliferation in humans, but are master regulators involved in lipid homeostasis and metabolic control activated by ligand binding and alter gene expression at the level of DNA. Insufficiencies have been linked to many neurodegenerative diseases while inactivation of EIF2 has indeed been found in patients suffering from AD and PD. The three AD cohorts analyzed by different labs at different times, are exceptionally similar. There are multiple pathways activated across all six diseases including IL-6 signaling, production of nitric oxide and reactive oxygen species in macrophages, and activation of neuroinflammation signaling pathway except that of FTD which seems to have contradicting activation information here. For example, the neuroinflammation pathway is marked as inactivated in FTD but has been reported to be activated. Furthermore, the overall data for FTD seems to show massive downregulation for majority of transcripts raising questions including the data deposited to GEO (GSE140830).

3.6 Molecular Functional Similarities and Differences Across Diseases

Figure 5A:
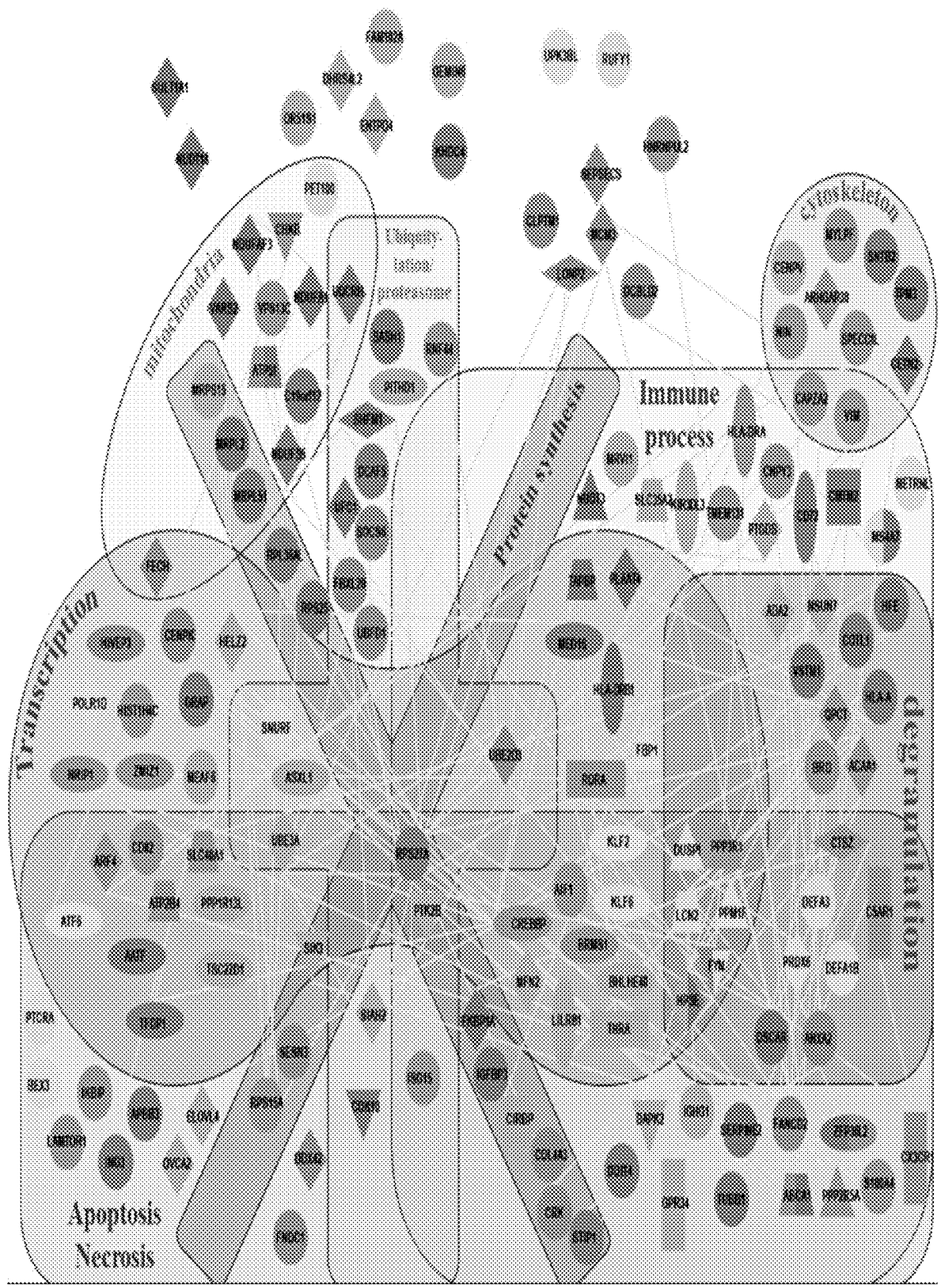
FIG. 5 is an illustration of functional categorization of RF transcripts across diseases. Transcripts selected by RF algorithm within each neurodegenerative disease were combined and categorized using IPA core analysis feature. Categories selected under IPA Disease and Functions output are combined using eight-way Venn diagram of overlapping categories including immune processes red and subset degranulation orange, apoptosis/necrosis blue, transcription regulation green, protein synthesis purple, ubiquitin/proteasome degradation cyan, cytoskeleton components pink, and mitochondria/metabolism yellow. Transcript outliers not functioning in any of the eight categories are grouped above the Venn graph. Legend defines shapes and colors of transcript symbols differentiating disease and type of transcript.
Figure 5B:
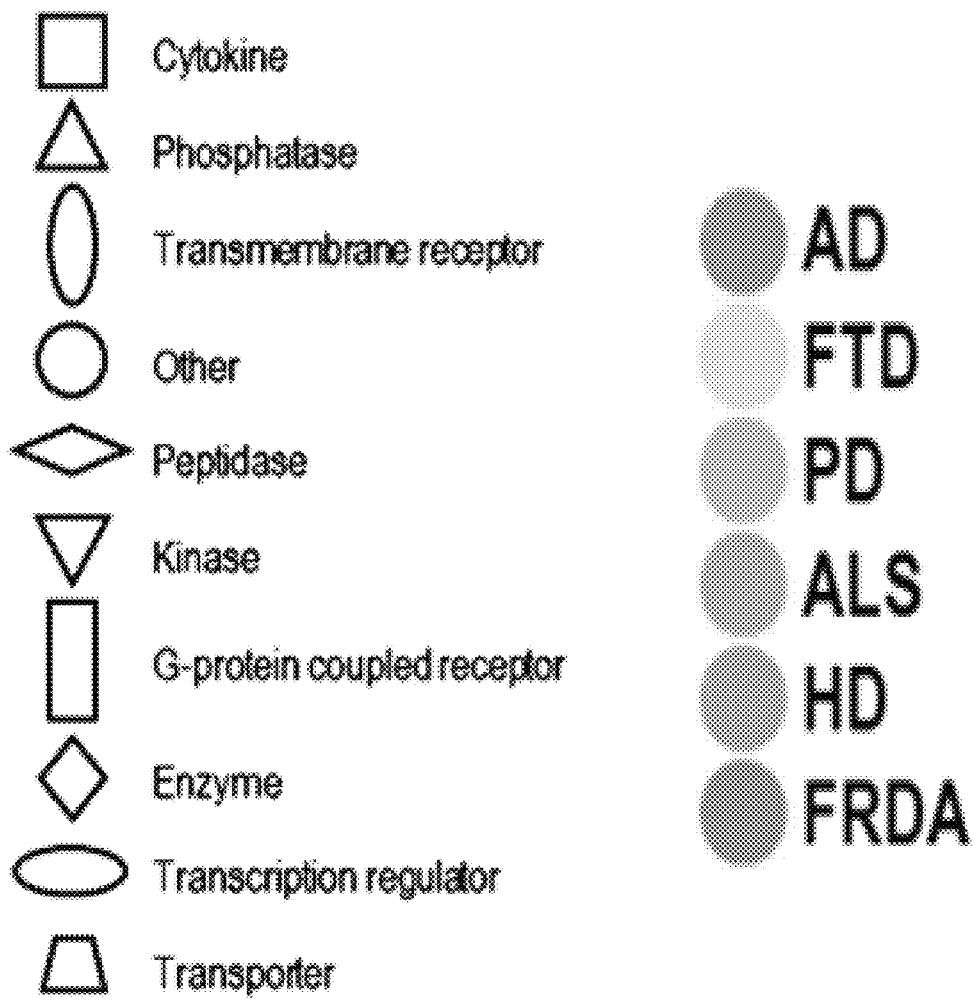

The top twenty ranked RF selected genes were combined for all disease cohorts and subjected to analysis by STRING v.11 b database for protein-protein interaction network construction. The threshold score was set at 0.7 (70% confidence) querying all interaction sources. The networks of non-directed edges were then visualized in Cytoscape software v. 3.4.0. The same 180 transcript gene symbols were uploaded to IPA where the disease and biological functions output generated by a core analysis in IPA guided our selection for the eight functional or compartmental categories of mitochondrial/metabolism (p=5.1E-03), protein synthesis (p=1.9E-04), ubiquitylation/proteasome (p=1.0E-4), cytoskeleton components (p=1.0E-4), immune processes (p=1.0E-04) including a subset of degranulation transcripts (p=7.8E-08), apoptosis/necrosis (p=1.4E-06), and transcriptional regulation (p=3.0E-06). We find that the diseases analyzed here occupy eight categories highlighting similarities across the diseases that may not be obvious from isolated standard analysis (FIG. 5). Blood and brain have common differentially expressed genes in AD implicating that parallel dysfunctional processes occurring in the brain are reflected in blood. Subsets of blood cells interact directly with brain cells and familial traits are universal. Separation was made using a novel Venn diagram resulting in all diseases appearing in six of the eight categories although represented by a variety of transcripts (FIG. 5). For these transcripts selected by RF on each disease, the cytoskeleton group does not include FTD, HD, or FRDA and additionally FTD is not represented in the protein synthesis group for the top twenty transcripts selected by RF here. This does not suggest that these select diseases do not have affected transcripts falling into these categories, but from the transcripts available in each of the blood datasets, the top RF transcripts selected here did not include members for cytoskeleton and protein synthesis.

There were several transcripts from each of the six diseases that failed to fit into any of the eight categories after inspection of current functional characterization information available to us (FIG. 5). While additional information may be needed to place these transcripts into one of the eight categories, perhaps these outliers represent unique dysfunctional features for each disease. Five transcripts were left uncategorized for PD include FAM102A, GEMIN6, OR51S1, ENTPD4, and lastly DHRS4L2, which is an unspecified short chain dehydrogenase/reductase. Early estrogen-induced gene 1 (FAM102A) is a target for osteoclast regulation and ENTPD4 is a Golgi protein involved in UDP nucleotide recycling. A common early PD symptom is that of olfactory dysfunction which may be related to downregulation of overturning olfactory receptors in brain and olfactory lobe. One PD transcript selected to differentiate disease from controls OR51S1 an olfactory receptor which can detect geosmin in infected water. The final uncategorized PD transcript GEMIN6 is associated with the spliceosome as is also the one AD transcript left outstanding KHDC4 predicted to be involved in splice site selection. Additionally, three of the outliers for HD (LONP2 (peroxisome), MCM3 (DNA replication), DCBLD2 (coagulation)) maintain interactions with members assigned to the eight categories marked by nondirected edges generated by STRING v.11b database text mining. However, an interaction prediction made using text mining does not necessarily mean there is an interaction. Further experimental evidence will be needed to validate the assignment of edges between transcripts. Another outlier for Huntington's disease is SEPSECS which is involved in selenoprotein synthesis and has been found to be significant in HD. For ALS, the one outlier (HNRNPUL2—heterogeneous Nuclear Ribonucleoprotein U Like 2 associated with a readthrough transcript) was assigned a nondirected edge with a member of the categorized transcripts belonging to apoptosis and immune processes. Behavioral variant FTD had two ambiguous transcripts remaining UPKC3BL (readthrough transcript Gene: ENSG00000205236, ENSG00000279168, ENSG00000267645) and RUFY1 which is predicted to be involved in endosomal trafficking. Finally, RF selected transcript outliers for FRDA include SULTA1A1 (sulfotransferase of catecholamines, phenolic drugs, neurotransmitters) and NUDT18 or MTH1 (nucleoside diphosphate linked moiety X linked to toxic nucleotide removal).

4.0 DISCUSSION

It is believed that the present disclosure and associated data accomplishes two things: 1) it indicates that multivariate analysis of RNA species in blood can serve as a valuable biomarker of Alzheimer's disease and selected additional neurodegenerative diseases and 2) it reveals that whole blood RNA profiles of the neurodegenerative diseases studied show that these diseases modulate the expression of basic cell biological processes that are imperative to the proper functioning of all cells.

The use of RNA in biomarker studies offers multiple advantages. The ability to amplify RNA/cDNA samples makes it possible to not only start with small sample sizes but also to detect changes in the expression of minimally expressed, but important, RNA species and detect biomarkers in an unbiased manner. Perhaps, most importantly, the ability to examine the entire transcriptome in an unbiased fashion offers the opportunity to detect unanticipated and potentially important aspects of disease pathophysiology— as exemplified by our conclusions of disease effects on fundamental cellular mechanisms in blood. This is best illustrated in our FIG. 5 which leads to the conclusion that there are eight fundamental cell biological functions that are altered in blood samples from six neurodegenerative diseases: transcription regulation, degranulation, immune response, protein synthesis, apoptosis, cytoskeleton components, ubiquitylation/proteasome, and metabolomic complexes. None of these eight are surprising, for various studies have shown these processes to be affected in the brain. For example: transcription regulation, degranulation, immune response, protein synthesis, apoptosis, cytoskeleton components, ubiquitylation/proteasome, and metabolomic complexes.

The finding that basic cellular processes are affected in both blood and brain during neurodegenerative disease suggests certain inferences about potential mechanism(s) responsible for this relationship. With respect to Alzheimer's disease, for example, it is notable that these basic cellular processes are affected in blood cells in the absence of plaques or neurofibrillary tangles. However, both Aβ oligomers and phospho-tau have been found in blood plasma. Although the fact that Aβ oligomers and phospho-tau are concurrent with these eight fundamental changes in blood transcripts is suggestive of a causative relationship, this concurrence is by no means formal proof of causation. This important issue is deserving of resolution.

Data such as presented here relate to a number of issues, among them applicability to clinical practice. Do sensitivities and specificities in the range of 75-80% presented here indicate suitability for clinical practice? Certainly, what we have presented here is not sufficient to establish a place in clinical practice, but this is a question appropriate for future developments of RNA, as well as other classes of biomarkers. What should be the criteria for use in clinical practice? Will blood biomarkers, in conjunction with other current diagnostic practice, improve the accuracy of diagnoses and will any improvement in diagnostic accuracy be sufficient to justify whatever the cost may be of a blood biomarker test? What level of accuracy is necessary to serve as a screening tool and will it offer sufficient societal benefit to offset the added costs of further testing of false positive cases? These questions suggest future study designs to explore the possibility of preclinical detection, there already exist data bases of RNA profiles of "normal" people that it would be useful to ascertain the current status of those who contributed samples ten or more years ago. Alternately, efforts should be made to collect data on "normal" people whose status is followed for future use in determining accuracy of preclinical disease detection.

Finally, we opted to work with publicly available data for our analysis in order to create multiple sizable datasets. This resulted in struggles with heterogeneities of multiple datasets curated by laboratories around the world on different microarray platforms from two separate manufacturers. Machine learning algorithms such as RF can handle large numbers of features, are inherently insensitive to outliers, and do not require a normal distribution, but can prove sensitive to microarray technical variation between datasets resultant from laboratory collection, compilation, and normalization of data. While the method of whole blood expression collection can affect the transcriptomic profile, we selected datasets reporting similar protocols for collection of the whole blood as described in methods. Additionally, many conditions are often difficult to distinguish from Alzheimer's disease, and autopsy confirmation of diagnoses were generally lacking. Some common conditions such as multi infarct dementia, were not available in the current selection of public data. Finally, many or even most patients with a clinical diagnosis of Alzheimer's disease prove to have mixed pathologies at autopsy examination most frequently including Lewy bodies, vascular lesions, and other proteinopathies further making clear cut distinctions between clinically diagnosed degenerative disease syndromes difficult. Nonetheless, transcriptomic profiles of neurodegeneration generally and individual diseases specifically hold great promise as a diagnostic tool providing the clinician with positive evidence of a suspected diagnosis and not simply another means for "ruling out" brain tumors or other nondegenerative causes of cognitive decline.

5.0 ADDITIONAL CONSIDERATIONS

In developing the present inventive concept, a meta-analysis with nine microarray datasets was performed for multiple neurodegenerative diseases searching for a small group of transcripts that may select diseased blood samples from controls for each of the six diseases studied. We then used the transcripts chosen by machine learning techniques to further study differential expression and canonical gene pathways affected in disease. Our analyses show that blood RNA can be used to distinguish multiple neurodegenerative diseases from healthy controls and found that the diseases tested here harbor dysfunctions converging onto a group of cellular processes including inflammation, ubiquitylation, apoptosis, metabolism, transcription, protein synthesis, and cytoskeleton components. However, our findings remain incomplete in parallel with lacking definitive current knowledge to identify what transcript products are doing in the cell and pathways. This incomplete information becomes more complex when we consider the pleiotropy of casual gene regulation and complexity of gene networks where transcript products may maintain alternative functional activities depending upon the cell type, tissue region, or context of activity in disease. We also encountered inconsistencies in analytical data preparation across cohorts which might explain the small overlap of transcript selection by RF to differentiate disease. For example, two of the three cohorts AD1 and AD2 were collected and analyzed by one research group but the third AD3 data set was assembled by another unrelated laboratory. Regardless, the two sets of selected transcripts for AD were able to differentiate disease from controls across all three cohorts with acceptable statistics. These inconsistencies might not be entirely the result of differences in laboratory instrumentation or protocols but could be explained by substantial preanalytical variations among research cohorts. It is also likely that AD and other diseases have inherent heterogeneity that may even be dynamic during the long preclinical phase of accumulating pathologies before clinical symptoms begin to develop.

In summary we report evidence for developing a noninvasive and inexpensive blood RNA test platform that can rule-out neurodegenerative disease or provide quick evidence for enrollment of subjects in clinical trials. Although the scientific community has a long way to go to understand the complexities of cellular processes in human, blood transcript changes can provide information for dysfunctional pathways in disease and further comparative analysis of blood and brain tissue will be key for the understanding of similarities and differences across multiple neurodegenerative disease. Successful approaches include standardization of protocols for collecting and analyzing shared cohort data and the inclusion of experimental hypotheses to explore temporal factors of disease where transcript expression may be different not only depending on cell type or tissue region but also may be dynamic as disease progresses.

Figure 13:
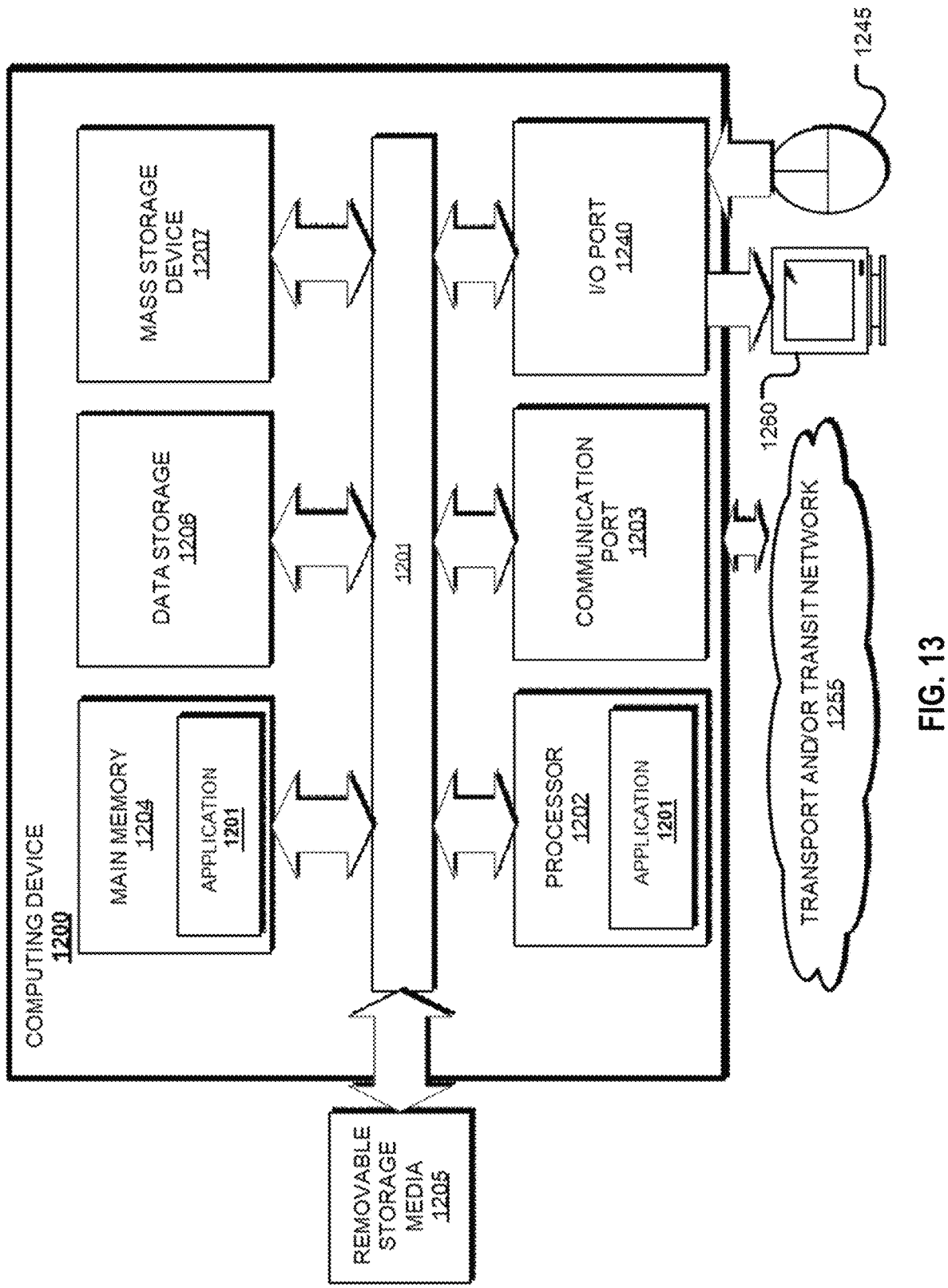
FIG. 13 is a simplified block diagram of an exemplary computing device that may be implemented along with the device described herein to execute functionality described herein.

Referring to FIG. 13, a computing device 1200 is illustrated which may be configured, via one or more of an application 1211 or computer-executable instructions, to execute functionality associated with diagnosing a neurodegenerative disease, as described herein. More particularly, in some examples, aspects of the methods herein may be translated to software or machine-level code, which may be installed to and/or executed by the computing device 1200 such that the computing device 1200 is configured for medical diagnosis, and other functionality described herein. It is contemplated that the computing device 1200 may include any number of devices, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments, and the like.

The computing device 1200 may include various hardware components, such as a processor 1202, a main memory 1204 (e.g., a system memory), and a system bus 1201 that couples various components of the computing device 1200 to the processor 1202. The system bus 1201 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computing device 1200 may further include a variety of memory devices and computer-readable media 1207 that includes removable/non-removable media and volatile/nonvolatile media and/or tangible media, but excludes transitory propagated signals. Computer-readable media 1207 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computing device 1200. Communication media includes computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The main memory 1204 includes computer storage media in the form of volatile/nonvolatile memory such as read only memory (ROM) and random access memory (RAM). A basic input/output system (BIOS), containing the basic routines that help to transfer information between elements within the computing device 1200 (e.g., during start-up) is typically stored in ROM. RAM typically contains data and/or program modules that are immediately accessible to and/or presently being operated on by processor 1202. Further, data storage 1206 in the form of Read-Only Memory (ROM) or otherwise may store an operating system, application programs, and other program modules and program data.

The data storage 1206 may also include other removable/non-removable, volatile/nonvolatile computer storage media. For example, the data storage 1206 may be: a hard disk drive that reads from or writes to non-removable, nonvolatile magnetic media; a magnetic disk drive that reads from or writes to a removable, nonvolatile magnetic disk; a solid state drive; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media provide storage of computer-readable instructions, data structures, program modules, and other data for the computing device 1200.

A user may enter commands and information through a user interface 1240 (displayed via a monitor 1260) by engaging input devices 1245 such as a tablet, electronic digitizer, a microphone, keyboard, and/or pointing device, commonly referred to as mouse, trackball or touch pad. Other input devices 1245 may include a joystick, game pad, satellite dish, scanner, or the like. Additionally, voice inputs, gesture inputs (e.g., via hands or fingers), or other natural user input methods may also be used with the appropriate input devices, such as a microphone, camera, tablet, touch pad, glove, or other sensor. These and other input devices 1245 are in operative connection to the processor 1202 and may be coupled to the system bus 1201, but may be connected by other interface and bus structures, such as a parallel port, game port or a universal serial bus (USB). The monitor 1260 or other type of display device may also be connected to the system bus 1201. The monitor 1260 may also be integrated with a touch-screen panel or the like.

The computing device 1200 may be implemented in a networked or cloud-computing environment using logical connections of a network interface 1203 to one or more remote devices, such as a remote computer. The remote computer may be a personal computer, a server, a router, a network PC, a peer device or other common network node, and typically includes many or all of the elements described above relative to the computing device 1200. The logical connection may include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computing device 1200 may be connected to a public and/or private network through the network interface 1203. In such examples, a modem or other means for establishing communications over the network is connected to the system bus 1201 via the network interface 1203 or other appropriate mechanism. A wireless networking component including an interface and antenna may be coupled through a suitable device such as an access point or peer computer to a network. In a networked environment, program modules depicted relative to the computing device 1200, or portions thereof, may be stored in the remote memory storage device.

Certain examples are described herein as including one or more modules. Such modules are hardware-implemented, and thus include at least one tangible unit capable of performing certain operations and may be configured or arranged in a certain manner. For example, a hardware-implemented module may comprise dedicated circuitry that is permanently configured (e.g., as a special-purpose processor, such as a field-programmable gate array (FPGA) or an application-specific integrated circuit (ASIC)) to perform certain operations. A hardware-implemented module may also comprise programmable circuitry (e.g., as encompassed within a general-purpose processor or other programmable processor) that is temporarily configured by software or firmware to perform certain operations. In some example examples, one or more computer systems (e.g., a standalone system, a client and/or server computer system, or a peer-to-peer computer system) or one or more processors may be configured by software (e.g., an application or application portion) as a hardware-implemented module that operates to perform certain operations as described herein.

Accordingly, the term "hardware-implemented module" encompasses a tangible entity, be that an entity that is physically constructed, permanently configured (e.g., hardwired), or temporarily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure the processor 1202, for example, to constitute a particular hardware-implemented module at one instance of time and to constitute a different hardware-implemented module at a different instance of time.

Hardware-implemented modules may provide information to, and/or receive information from, other hardware-implemented modules. Accordingly, the described hardware-implemented modules may be regarded as being communicatively coupled. Where multiple of such hardware-implemented modules exist contemporaneously, communications may be achieved through signal transmission (e.g., over appropriate circuits and buses) that connect the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation, and may store the output of that operation in a memory device to which it is communicatively coupled. A further hardware-implemented module may then, at a later time, access the memory device to retrieve and process the stored output. Hardware-implemented modules may also initiate communications with input or output devices.

Computing systems or devices referenced herein may include desktop computers, laptops, tablets e-readers, personal digital assistants, smartphones, gaming devices, servers, and the like. The computing devices may access computer-readable media that include computer-readable storage media and data transmission media. In some examples, the computer-readable storage media are tangible storage devices that do not include a transitory propagating signal. Examples include memory such as primary memory, cache memory, and secondary memory (e.g., DVD) and other storage devices. The computer-readable storage media may have instructions recorded on them or may be encoded with computer-executable instructions or logic that implements aspects of the functionality described herein. The data transmission media may be used for transmitting data via transitory, propagating signals or carrier waves (e.g., electromagnetism) via a wired or wireless connection.

It should be understood from the foregoing that, while particular examples have been illustrated and described, various modifications can be made thereto without departing from the spirit and scope of the invention as will be apparent to those skilled in the art. Such changes and modifications are within the scope and teachings of this invention as defined in the claims appended hereto.

What is claimed is:

1. A method for computer-implemented diagnosis of a neurodegenerative disease, comprising:
    training a machine learning model via a processor, by steps including:
        accessing both whole blood expression datasets associated with the neurodegenerative disease and sample datasets, the sample datasets being derived from physical samples and including whole human blood mRNA gene expressions processed in normalized form, and
        analyzing the whole human blood mRNA gene expressions of the sample datasets and ranking an ability of each of a plurality of RNA blood transcripts of the whole human blood mRNA gene expressions to classify affected samples for a diagnosis of a neurodegenerative disease, including:
            building a first plurality of classifier trees,
            selecting a first set of top classifiers from the first plurality of classifier trees,
            building a second plurality of classifier trees using the first set of top classifiers, and
            selecting and saving a second set of top classifiers from the second plurality of classifier trees, the second set of top classifiers defining selected transcripts; and
    implementing, via the processor, the machine learning model to diagnose the neurodegenerative disease using Random Forest classification, by:
        extracting data from a blood sample associated with a patient to undergo Random Forest classification; and
        generating, by a processor, a machine learning prediction of a diagnosis of a neurodegenerative disease afflicting the patient by:
        applying the data from the blood sample as input to the machine learning model, the data from the blood sample being applied in view of an RNA blood transcript of the plurality of RNA blood transcripts predetermined by the training of the machine learning model to be indicative of the neurodegenerative disease, and
        performing Random Forest classification on the data from the blood sample, wherein the Random Forest classification includes building an ensemble of multiple classifier trees,
        wherein final prediction for the blood sample is obtained by majority vote on a combination of predictions of all of the multiple classifier trees.

2. The method of claim 1, further comprising applying by the processor multivariant discriminant analysis to normalized data associated with the second set of top classifiers.

3. The method of claim 1, further comprising applying by the processor pathway analysis to group functional processes revealed by the selected transcripts.

4. The method of claim 1, further comprising utilizing a Glucuronidase Beta (GUSB) expression level for normalization of the whole human blood mRNA gene expressions.

5. The method of claim 1 wherein the Random Forest classification includes an implementation of Random Forests with a modification where an individual tree is built by first selecting a training set of n samples with replacement from N samples referred to as bootstrap sampling.

6. The method of claim 5, wherein the bootstrap sampling excludes a portion of samples in a tree building training set.

7. The method of claim 6, wherein the portion of samples excluded are utilized as internal test predictors to provide an internal estimate of generalization error of the Random Forest classification.

8. The method of claim 5, further comprising selecting a small subset (f) of transcript features (F), $f=\sqrt{F}$, at random to partition each binary node in the tree according to a weighted Gini impurity index:

$$(1-\Sigma_{i=1}^{n} p_i^2).$$

which measures the likelihood of misclassification.

9. The method of claim 1, further comprising adjusting the sample datasets by age and sex and quantifying an expression change in the neurodegenerative disease.

10. The method of claim 1, further comprising generating by the processor a Random Forest (RF) algorithm that derives supervised predictors for different neurodegenerative diseases.

11. The method of claim 10, further comprising generating transcriptional clusters to make clinical group discriminations unique to each of the different neurodegenerative diseases.

12. The method of claim 1, further comprising generating, by the processor, a plurality of transcript predictors and comparing the predictors across diseases to identify biological process similarities and molecular process differences.

13. The method of claim 1, wherein the Random Forest classification includes building an ensemble of a third plurality of classifier trees, where the final prediction for a test sample is obtained by majority vote on the combination of predictions of all of the third plurality of classifier trees.

14. The method of claim 1, wherein the neurodegenerative disease is Alzheimer's disease, Parkinson's disease, Huntington's disease, amyotrophic lateral sclerosis (ALS), behavioral variant frontotemporal dementia (bvFTD), or Friedreich's ataxia.

* * * * *